US012720490B2

(12) United States Patent
Nader et al.

(10) Patent No.: US 12,720,490 B2
(45) Date of Patent: Aug. 25, 2026

(54) APPARATUSES AND METHODS FOR PAGING

(71) Applicant: Telefonaktiebolaget LM Ericsson (publ), Stockholm (SE)

(72) Inventors: Ali Nader, Malmö (SE); Andres Reial, Höllviken (SE); Sina Maleki, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 312 days.

(21) Appl. No.: 18/281,520

(22) PCT Filed: Mar. 7, 2022

(86) PCT No.: PCT/EP2022/055766
§ 371 (c)(1),
(2) Date: Sep. 11, 2023

(87) PCT Pub. No.: WO2022/189362
PCT Pub. Date: Sep. 15, 2022

(65) Prior Publication Data

US 2024/0155559 A1 May 9, 2024

(30) Foreign Application Priority Data

Mar. 12, 2021 (SE) .................................... 2130070-2

(51) Int. Cl.
*H04W 68/02* (2009.01)
*H04B 7/06* (2006.01)

(52) U.S. Cl.
CPC ........ *H04W 68/02* (2013.01); *H04B 7/06952* (2023.05)

(58) Field of Classification Search
CPC ..... H04W 68/02; H04W 68/00; H04W 16/28; H04B 7/06952; H04B 7/0408; Y02D 30/70
See application file for complete search history.

(56) References Cited

U.S. PATENT DOCUMENTS 6,272,117 B1 * 8/2001 Choi ................. H04W 74/0866 370/348
2012/0063373 A1 * 3/2012 Chincholi ............ H04L 5/0064 370/281

(Continued)

FOREIGN PATENT DOCUMENTS

CN 106658389 B 5/2019
WO 2018/144873 A1 8/2018

(Continued)

OTHER PUBLICATIONS

International Search Report and Written Opinion with Transmittal dated Jun. 30, 2022 issued in International Patent Application No. PCT/EP2022/055766 (13 pages).

(Continued)

*Primary Examiner* — Kenneth T Lam
(74) *Attorney, Agent, or Firm* — Rothwell, Figg, Ernst & Manbeck, P.C.

(57) ABSTRACT

The present disclosure relates to telecommunications. In one of its aspects, the disclosure concerns a method in a Radio Access Network (RAN) node for updating a paging configuration for at least one User Equipment (UE) in a wireless communications system. The RAN node uses at least one radio beam for transmitting at least one paging message to said UE(s). The method comprises obtaining information regarding at least one paging condition. The at least one paging condition is associated with a current paging configuration for said at least one UE and comprises at least one of a false paging rate, latency, PDCCH load, and PDCCH (Continued)

and PDSCH imbalance. The method further comprises determining whether the obtained information regarding the at least one paging condition exceeds a respective associated threshold; and updating, based on the determination, the current paging configuration into an updated paging configuration for said at least one UE. Updating the current paging configuration comprises adjusting one or more configurations of the one or more radio beams for transmitting a paging message to said at least one UE.

20 Claims, 15 Drawing Sheets

(56) References Cited

U.S. PATENT DOCUMENTS

| | | | | |
|---|---|---|---|---|
| 2018/0054780 | A1* | 2/2018 | Radulescu | H04W 68/005 |
| 2019/0306829 | A1* | 10/2019 | Abedini | H04W 68/02 |
| 2021/0014823 | A1* | 1/2021 | Takeda | H04W 72/21 |
| 2021/0084615 | A1* | 3/2021 | Priyanto | H04W 68/06 |
| 2021/0360582 | A1* | 11/2021 | Priyanto | H04W 4/08 |
| 2022/0124671 | A1* | 4/2022 | Taherzadeh Boroujeni | H04W 68/005 |
| 2022/0182971 | A1* | 6/2022 | Wang | H04W 56/0015 |
| 2022/0417851 | A1* | 12/2022 | Priyanto | H04W 52/0235 |
| 2023/0217412 | A1* | 7/2023 | Zhang | H04W 68/02 455/458 |
| 2023/0319747 | A1* | 10/2023 | Goyal | H04W 68/02 370/503 |
| 2024/0031984 | A1* | 1/2024 | Li | H04W 36/08 |

FOREIGN PATENT DOCUMENTS

| | | | |
|---|---|---|---|
| WO | 2019/063867 | A1 | 4/2019 |
| WO | 2019/099661 | A1 | 5/2019 |
| WO | 2020/061933 | A1 | 4/2020 |
| WO | 2020/254922 | A1 | 12/2020 |
| WO | 2021/018531 | A1 | 2/2021 |

OTHER PUBLICATIONS

SE Patent Office (PRV), Search Report and Written Opinion in application No. SE 2130070-2, dated Nov. 8, 2021 (9 pages).

Ericsson, "False alarms with Paging", R2-1906606, 3GPP TSG-RAN2 Meeting #106, Reno, USA, May 13-17, 2019 (5 pages).

Samsung, "Paging in NR", R2-1700016, 3GPP TSG-RAN WG2 NR, Spokane, USA, Jan. 17-19, 2017 (5 pages).

* cited by examiner

Figure 6:
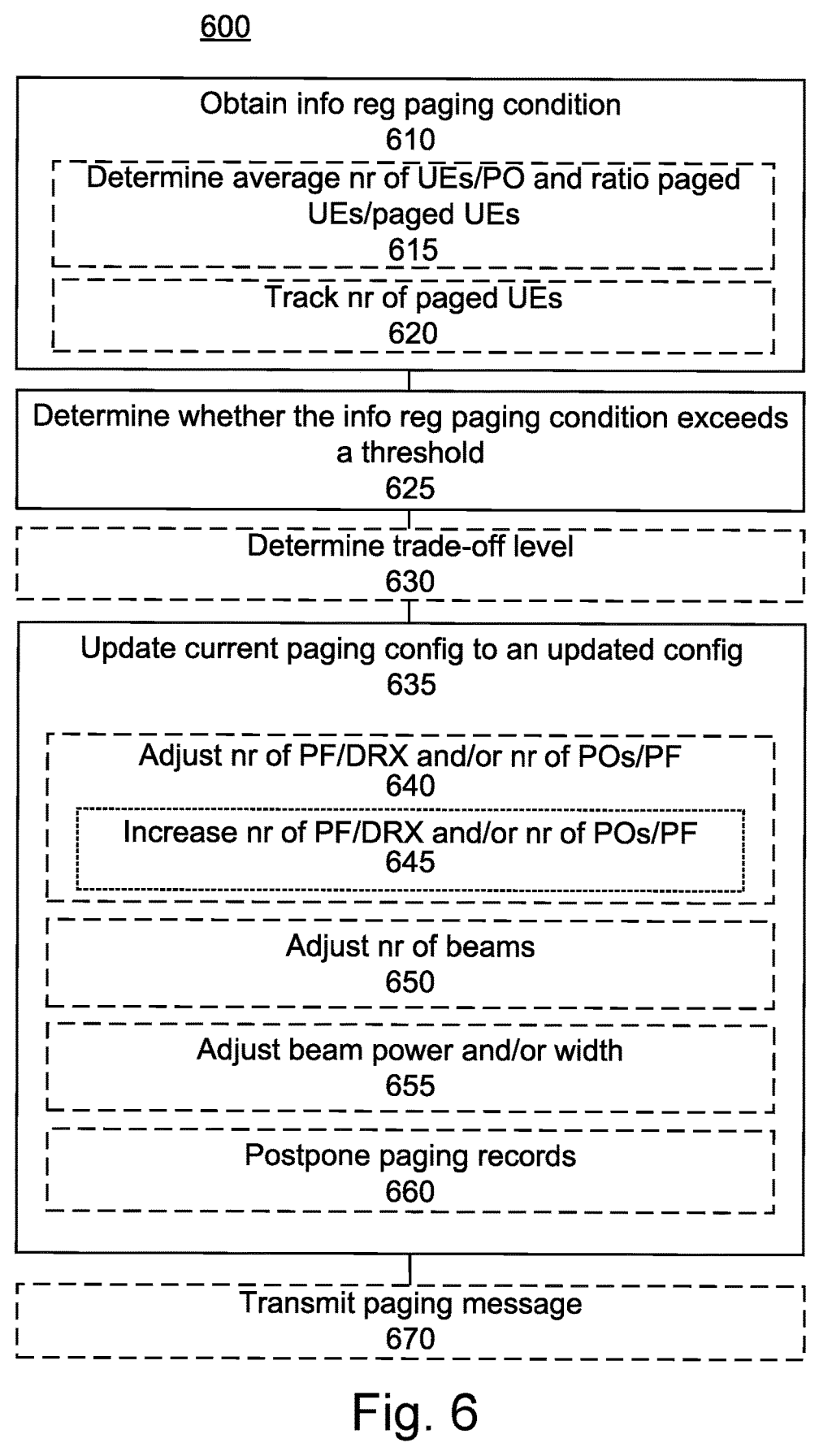

600

Obtain info reg paging condition
610

Determine average nr of UEs/PO and ratio paged UEs/paged UEs
615

Track nr of paged UEs
620

Determine whether the info reg paging condition exceeds a threshold
625

Determine trade-off level
630

Update current paging config to an updated config
635

Adjust nr of PF/DRX and/or nr of POs/PF
640

Increase nr of PF/DRX and/or nr of POs/PF
645

Adjust nr of beams
650

Adjust beam power and/or width
655

Postpone paging records
660

Transmit paging message
670

Figure 8:
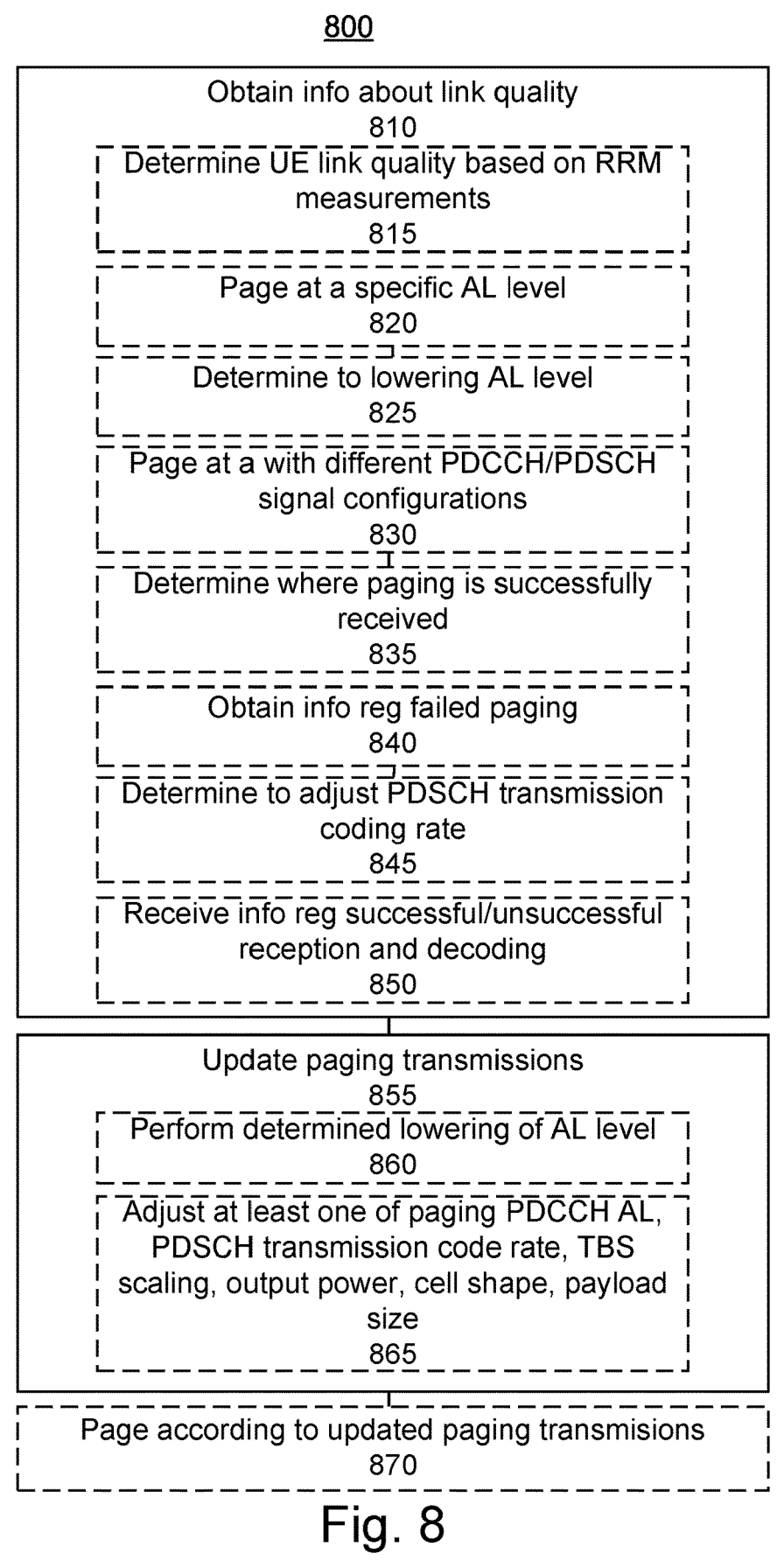

Obtain info about link quality
810

Determine UE link quality based on RRM measurements
815

Page at a specific AL level
820

Determine to lowering AL level
825

Page at a with different PDCCH/PDSCH signal configurations
830

Determine where paging is successfully received
835

Obtain info reg failed paging
840

Determine to adjust PDSCH transmission coding rate
845

Receive info reg successful/unsuccessful reception and decoding
850

Update paging transmissions
855

Perform determined lowering of AL level
860

Adjust at least one of paging PDCCH AL, PDSCH transmission code rate, TBS scaling, output power, cell shape, payload size
865

Page according to updated paging transmisions
870

Receive an updated paging configuration and/or paging transmission
1010

Respond to a received paging
1020

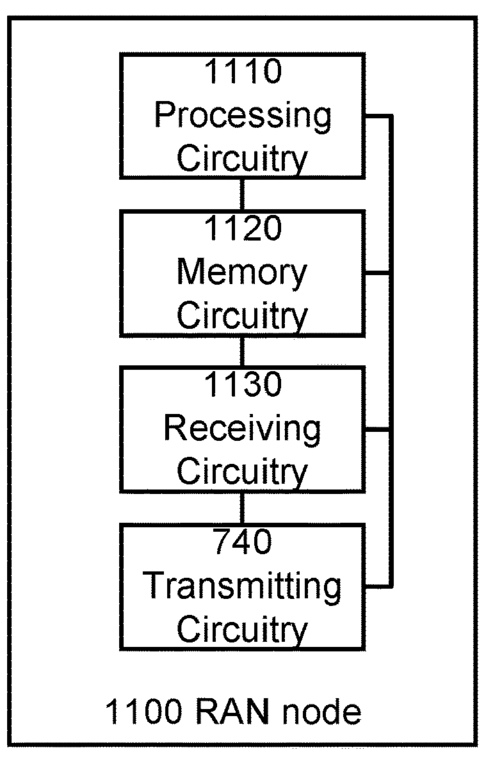
Fig. 11
1210 Processing Circuitry
1220 Memory Circuitry
1230 Receiving Circuitry
1240 Transmitting Circuitry
1200 RAN node
Fig. 12
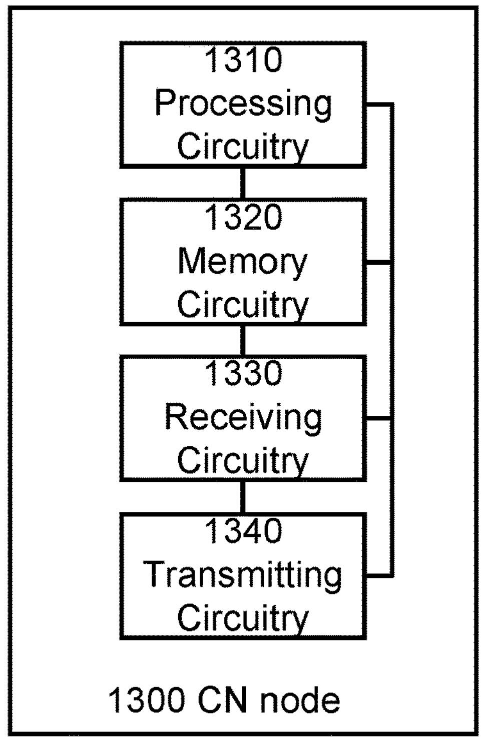
Fig. 13
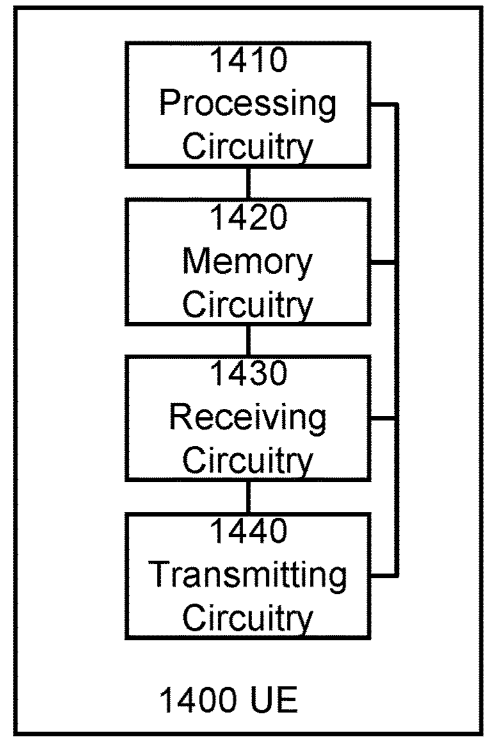
Fig. 14

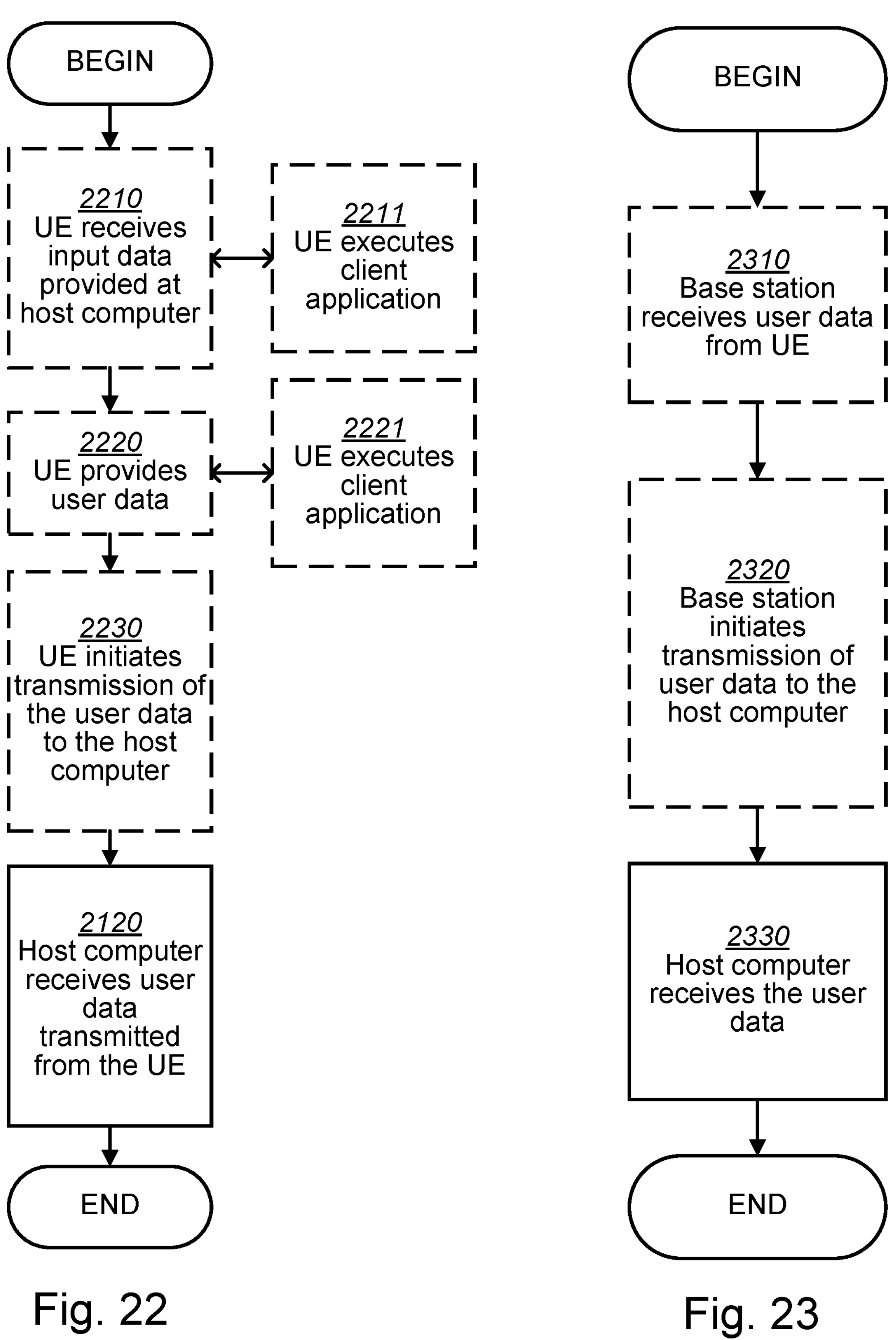
BEGIN
2210
UE receives input data provided at host computer
2211
UE executes client application
2220
UE provides user data
2221
UE executes client application
2230
UE initiates transmission of the user data to the host computer
2120
Host computer receives user data transmitted from the UE
END
Fig. 22
BEGIN
2310
Base station receives user data from UE
2320
Base station initiates transmission of user data to the host computer
2330
Host computer receives the user data
END
Fig. 23

APPARATUSES AND METHODS FOR PAGING

CROSS REFERENCE TO RELATED APPLICATIONS

This application is a 35 U.S.C. § 371 National Stage of International Patent Application No. PCT/EP2022/055766, filed 2022 Mar. 7, which claims priority to SE Patent Application No. 2130070-2, filed on 2021 Mar. 12. The above-identified SE application is incorporated by this reference.

TECHNICAL FIELD

The present disclosure generally relates to telecommunications. In particular, the various embodiments described in this disclosure relate to apparatuses and methods for updating a paging configuration in a wireless communications system where at least one beam is used.

BACKGROUND

This section is intended to provide a background to the various embodiments described in this disclosure. Therefore, unless otherwise indicated herein, what is described in this section should not be interpreted to be prior art by its mere inclusion in this section. This section is mainly described with reference to 5G New Radio (NR). However, it may be appreciated that this will not limit the present disclosure to 5G NR.

Idle Discontinuous Reception

Idle/inactive Discontinuous Reception (DRX) is a key energy saving mechanism allowing a User Equipment (UE) to remain in deep sleep a dominant fraction of the time when no data transmission is ongoing. DRX operation by a UE entails paging monitoring and Radio Resource Management (RRM) measurements to determine the appropriate camping cell. The network configures the UE with a DRX period that determines the paging monitoring rate. Typically, RRM measurements are performed at same rate.

Paging Occasions and Associated Configuration

Per DRX cycle, upon wakeup at a Paging Occasion (PO) assigned to the UE, the UE tries to decode the Physical Downlink Control Channel (PDCCH) and determine whether a Downlink Control Information (DCI), e.g., DCI format 1_0, scrambled with P-RNTI (Paging-Radio Network Temporary Identifier) is received. In case the DCI was transmitted from the network and successfully decoded by the UE, the UE checks the content to see whether there is information about a paging message in an associated the Physical Downlink Shared Channel (PDSCH). In such case, the UE captures and decodes the PDSCH in search for its UE identity. It shall be noted that multiple UEs may be associated with the same PO, i.e., the paging message to multiple UEs are multiplexed in one PDSCH scheduled by the same paging DCI. In case the UE finds its UE identity in the paging message, it sets up a connection towards the network, i.e. a paging response. Otherwise, the UE goes back to sleep and restarts the whole procedure at the next DRX occasion.

The network typically configures multiple POs over the duration of a UE DRX cycle. Each UE is assigned to one of these POs per DRX cycle via a 3GPP specified formula based on the UE identity. More specifically, the network has the option to configure how many and which of the frames (10 ms) during the DRX cycle that shall be used for paging. The DRX cycle has a configurable length. Furthermore, the network may configure the number of POs per frame, e.g. 1, 2 or 4 POs/frame. This is exemplified in FIG. 1. In FIG. 1 a DRX cycle of 2.56 seconds is configured. Within the DRX cycle as shown in FIG. 1, the network has configured all the 256 frames for paging. Within each of these frames there may be up to 4 POs in different slots (not depicted in the Figure). Based on the aforementioned formula, the UE according to this example is associated to the third frame, i.e. frame 2. The UE is further associated to one of the 4 POs in this frame. Hence, every 2.56 seconds, this UE will wake up at its associated paging slot (PO) of frame 2 in search for a potential paging message.

In addition to DRX, Page Frames (PFs), and POs, as part of paging configuration, the network may further provide the number and configuration of the beams within which the UE should monitor paging in a PO.

SSB Transmission

In 5G NR deployments, a cell is identified using one or more, up to 64 in FR2, Synchronization Signal Block (SSB) beams. An SSB occupies 20 Resource Blocks (RBs) and contains 3 components: a Primary Synchronization Signal (PSS) for coarse synchronization and cell group identification, a Secondary Synchronization Signal (SSS) for cell identification, and a Physical Broadcast Channel (PBCH) for primary System Information (SI) delivery (Management Information Base (MIB)). PSS and SSS are sequence-based while PBCH is encoded and includes Demodulation Reference Signal (DMRS) for channel estimation to enable decoding. Examples are illustrated in FIGS. 2 and 3.

The multiple SSB beams are distributed in time, as illustrated in FIG. 4. SS block time locations are indexed from 0 to L−1 in increasing order within a half radio frame

- L=4
  - SS block time index are indicated by the 2 Least Significant Bits (LSB) of the 3 bits indicating 8 different PBCH-DMRS sequences (the Most Significant Bit (MSB) is used for half-frame index)
- L=8
  - SS block time index are indicated by 8 different PBCH-DMRS sequences
- L=64
  - LSBs of SS block time index are indicated by 8 different PBCH-DMRS sequences
  - MSBs of SS block time index are indicated in NR-PBCH payload
  - 3 bits in NR-PBCH payload in below 6 GHz case may be used for other purpose(s)

Joint usage of NR-PBCH DMRS sequences and explicit bits, L=64 case, in NR-PBCH payload to indicate SS block time index follows the following principles:

- MSB bits (b5, . . . , b3) for SS block time index in NR-PBCH payload only in case of above 6 GHz
- These 3 bits in below 6 GHz case are used for other purpose, 2 reserved bits and 1 MSB bit for SSB-subcarrier-offset
- 2 or 3 LSB bits of SSB index are indicated by 4 or 8 DMRS sequences
- For example, for 120 kHz SCS, FIG. 5 shows the indication of SSB time index from 0 to 63. Each small box means a slot, each of which includes 2 SSBs, and 8 DMRS sequences maps to 4 boxes Beamforming in NR In a 5G network, a base station, e.g. a gNB, may manage a cell by sequentially transmitting signals in a series of directions from the base station. Each direction is referred to as a 'beam' and covers a respective region, area, of the cell. Thus, the base station may transmit a beam in a specific direction at a specific time and then change the direction by a set amount in the next time frame until the base station has scanned all the regions, or areas, it should cover. In multi-beam operations, the length of one PO is one period of beam sweeping including S consecutive Paging Monitoring Occasion (PMOs), where S denotes the number of beams. The UE may assume that the same paging message is repeated in all beams of the sweeping pattern and thus, the selection of the beam(s) for the reception of the paging message is up to UE.

Documents, e.g., WO2021018531A1, WO2019063867A1, and WO2020061933A1 disclose methods regarding paging transmission in a wireless communication system. However, these documents did not consider various challenges in multi-beam operations for paging.

SUMMARY

In conventional network deployments, the network may select a common, static paging configuration for all UEs, with a constant number of POs and fixed signalling formats and configurations. This allows operating with a uniform and predictable paging transmission pattern, ensuring robust coverage for the entire cell. However, this leads to that the needs of UEs with the most demanding use cases or worst-case channel conditions are always catered. This may result in suboptimal configurations for other UEs or for the network in less demanding scenarios. Furthermore, another problem may arise when there is a paging load at the network side with a large number of PDCCH transmissions potentially with few UEs paged per PO. Yet another problem may be when some UEs are often paged, then false paging may be generated because a large number of UEs sharing the same PO. Another problem may be that the UEs are not evenly distributed in all beam directions, and then each beam may have its own optimal configuration for paging the UEs monitoring the beam. Yet another problem may be that when one or more UEs are in overlapping areas covered by one or more radio beams, paging them with different beams may not be optimal.

Accordingly, there is a need for improved paging configuration and signalling approaches that may optimize the DRX operation and paging transmissions for individual UEs while minimizing paging-related network resources and impact on data capacity, especially when a network node employs multiple beams to serve multiple UEs.

It is in view of the above background and other considerations that the various embodiments of the present disclosure have been made. It is proposed to provide a solution to address this problem, i.e. improve paging configuration and signalling in order to optimize the DRX operation and paging transmissions for individual UEs while minimizing paging-related network resources and impact on data capacity when a NW node employs multiple beams to serve multiple UEs.

This general object has been addressed by the appended independent claims. Advantageous embodiments are defined in the appended dependent claims.

According to a first aspect, there is provided a method in a Radio Access Network (RAN) node for updating a paging configuration for at least one UE in a wireless communications system. The RAN node uses a plurality of radio beams to page a plurality of UEs. The RAN node uses at least one of the radio beams for transmitting at least one paging message to at least one of the UEs.

The method comprises obtaining information regarding at least one paging condition. The at least one paging condition is associated with a current paging configuration for said at least one UE. The at least one paging condition comprises at least one of a false paging rate, latency, PDCCH load, and PDCCH and PDSCH imbalance. The method further comprises determining whether the obtained information regarding the at least one paging condition exceeds a respective associated threshold and updating, based on the determination, the current paging configuration into an updated paging configuration for said at least one UE.

In some embodiments, the method further comprises transmitting, to said at least one UE, at least one paging message in said at least one radio beam in accordance with the updated paging configuration.

In some embodiments, the at least one paging condition comprises a false paging rate and obtaining information regarding at least one paging condition further comprises determining an average number of UEs paged per PO and a statistical ratio of paged UEs versus camping UEs.

In some embodiments, the at least one paging condition comprises a false paging rate and obtaining information regarding the at least one paging condition further comprises tracking, during a time frame, a number of different paged UEs.

In some embodiments, updating the current paging configuration into an updated paging configuration comprises adjusting at least one of a number of Page Frames (PF) per DRX cycle and a number of POs per PFs. The at least one paging condition may comprise the false paging rate and, when it is determined that the false paging rate exceeds the corresponding threshold, the step of adjusting at least one of the number of PF per DRX cycle and the number of POs per PFs may comprise increasing at least one of the number of PFs per DRX cycle and the number of POs per PFs In some embodiments, the at least one paging condition comprises a paging response rate and the step of updating the current paging configuration into an updated paging configuration comprises adjusting a number of radio beams used for the paging.

In some embodiments, updating the current paging configuration into an updated paging configuration comprises adjusting at least one of beam power or beam width of the at least one radio beam used for the paging.

In some embodiments, the at least one paging condition comprises a paging priority and updating the current paging configuration into an updated paging configuration comprises postponing paging records that are below the respective associated threshold to a next paging occasion.

In some embodiments, the at least one paging condition comprises at least two of a false paging rate, latency and PDCCH load, and the method further comprises determining an acceptable trade-off level between the at least two paging conditions based on the determination of whether the obtained information regarding the at least two paging conditions exceed respective associated thresholds.

According to a second aspect, there is provided a method in a RAN node for updating paging transmission parameters in a wireless communications system.

The method comprises obtaining information regarding UE link quality in a cell of the wireless communications system and updating, based on the obtained information regarding UE link quality, the paging transmission parameters.

In some embodiments, the obtained information regarding UE link quality relates to an average UE link quality or to a worst case UE link quality in the cell.

In some embodiments, the method further comprises transmitting at least one paging message to at least one UE according to the updated paging transmission parameters.

In some embodiments, obtaining information regarding UE link quality in a cell of the wireless communications system comprises determining the UE link quality based on reported RRM measurements. The RRM measurements were made when the UEs were in a connected mode, in conjunction with handovers and/or connection loss.

In some embodiments, obtaining information regarding UE link quality in a cell of the wireless communications system comprises transmitting at least one paging message to a plurality of UEs at a specific PDCCH Aggregation Level (AL). If more than a threshold value of the plurality of UEs responded to the at least one paging message after a maximum number of paging attempts, the method further comprises determining that the paging transmission parameters is to be updated by lowering the specific PDCCH AL.

In some embodiments, updating the paging transmission parameters comprises performing the determined lowering of the PDCCH AL. Different PDCCH ALs may be used in different radio beams.

In some embodiments, obtaining information regarding UE link quality in a cell of the wireless communications system comprises transmitting at least one paging message to a plurality of UEs with different PDCCH and/or PDSCH signal configurations and determining, based on a highest-rate signal configuration where the at least one paging message is successfully received, the information regarding the UE link quality.

In some embodiments, obtaining information regarding UE link quality in a cell of the wireless communications system comprises receiving, from a plurality of UEs, information regarding successful and/or unsuccessful reception and decoding of PDCCH and PDSCH.

In some embodiments, obtaining information regarding UE link quality in a cell of the wireless communications system comprises obtaining information regarding failed paging related to at least one UE; and determining, based on the obtained information, to adjust PDSCH transmission code rate.

In some embodiments, updating the paging transmission parameters comprises adjusting at least one of a paging PDCCH AL, PDSCH transmission code rate, Transport Block Size (TBS) scaling, output power, cell shape and payload size. Different TBS scaling and/or output power may be used in different radio beams.

According to a third aspect, there is provided a method in a Core Network (CN) node for updating a paging configuration for at least one UE in a wireless communications system.

The method comprises obtaining information associated with UE type of the at least one UE, and determining, based on the obtained information associated with UE type of the at least one UE, whether a current paging configuration used by the at least one UE is to be updated to an updated paging configuration for said at least one UE. The method further comprises updating, based on the determination, the current paging configuration used by the at least one UE into the updated paging configuration for said at least one UE.

In some embodiments, the method further comprises broadcasting said updated paging configuration for said at least one UE.

In some embodiments, updating the current paging configuration into an updated paging configuration comprises adjusting a length of a DRX cycle.

In some embodiments, the obtained information associated with UE type of the at least one UE comprises information associated with a service application of the at least one UE. When it is determined that the current paging configuration is to be updated to an updated paging configuration due to that the service application has changed, or is to be changed, from enhanced Mobile BroadBand (eMBB) to Ultra-Reliable Low-Latency Communication (URLLC), adjusting the length of the DRX cycle comprises decreasing a length of the DRX cycle.

According to a fourth aspect, there is provided a method in a UE for performing paging in a wireless communications system.

The method comprises receiving, from a RAN node, an updated paging configuration and/or updated paging transmission parameters.

In some embodiments, the method further comprises responding to a received paging.

According to a fifth aspect, there is provided a RAN node configured to perform the method according to the first aspect.

The RAN node is configured for updating a paging configuration in a wireless communications system. The RAN node comprises a processing circuitry and a memory circuitry. The memory circuitry storing computer program code which, when run in the processing circuitry, causes the RAN node to obtain information regarding at least one paging condition. The at least one paging condition is associated with a current paging configuration for said at least one UE. The at least one paging condition comprises at least one of a false paging rate, latency, PDCCH load, and PDCCH and PDSCH imbalance. The RAN node is further caused to determine whether the obtained information regarding the at least one paging condition exceeds a respective associated threshold and to update, based on the determination, the current paging configuration into an updated paging configuration for said at least one UE.

In some embodiments, the RAN node further is caused to transmit, to said at least one UE, at least one paging message in said at least one radio beam in accordance with the updated paging configuration.

In some embodiments, the at least one paging condition comprises a false paging rate and the RAN node is further caused to obtain information regarding at least one paging condition by determining an average number of UEs paged per PO and a statistical ratio of paged UEs versus camping UEs.

In some embodiments, the at least one paging condition comprises a false paging rate and the RAN node is further caused to obtain information regarding at least one paging condition by tracking, during a time frame, a number of different paged UEs.

In some embodiments, the RAN node is further caused to update the current paging configuration into an updated paging configuration by adjusting at least one of a number of PF per DRX cycle and a number of POs per PFs.

In some embodiments, the at least one paging condition comprises a false paging rate and, when it is determined that the false paging rate exceeds the corresponding threshold, the RAN node is further caused to adjust at least one of the number of PF per DRX cycle and the number of POs per PFs by increasing at least one of the number of PFs per DRX cycle and the number of POs per PFs.

In some embodiments, the at least one paging condition comprises a paging response rate and the RAN node is caused to update the current paging configuration into an updated paging configuration by adjusting a number of radio beams used for the paging.

In some embodiments, the RAN node is caused to update the current paging configuration into an updated paging configuration by adjusting at least one of beam power or beam width of the at least one radio beam used for the paging.

In some embodiments, the at least one paging condition comprises a paging priority and the RAN node is caused to update the current paging configuration into an updated paging configuration by postponing paging records that are below the respective associated threshold to a next paging occasion.

In some embodiments, the at least one paging condition comprises at least two of a false paging rate, latency and PDCCH load. The RAN node is further caused to determine an acceptable trade-off level between the at least two paging conditions based on the determination of whether the obtained information regarding the at least two paging conditions exceed respective associated thresholds.

According to a sixth aspect, there is provided a RAN node configured to perform the method according to the second aspect.

The RAN node is configured for updating paging transmission parameters in a wireless communications system. The RAN node comprises a processing circuitry and a memory circuitry. The memory circuitry storing computer program code which, when run in the processing circuitry, causes the RAN node to obtain information regarding UE link quality in a cell of the wireless communications system and to update, based on the obtained information regarding UE link quality, the paging transmission parameters.

In some embodiments, the obtained information regarding UE link quality relates to an average UE link quality or to a worst case UE link quality in the cell.

In some embodiments, the RAN node is further caused to transmit at least one paging message to at least one UE according to the updated paging transmission parameters.

In some embodiments, the RAN node is caused to obtain information regarding UE link quality in a cell of the wireless communications system by determining the UE link quality based on reported RRM measurements. The RRM measurements were made when the UEs were in a connected mode, in conjunction with handovers and/or connection loss.

In some embodiments, the RAN node is caused to obtain information regarding UE link quality in a cell of the wireless communications system by transmitting at least one paging message to a plurality of UEs at a specific PDCCH AL. If more than a threshold value of the plurality of UEs responded to the at least one paging message after a maximum number of paging attempts, the RAN node is further caused to determine that the paging transmission parameters is to be updated by lowering the specific PDCCH AL. The RAN node may be caused to update the paging transmission parameters by performing the determined lowering of the PDCCH AL. For example, different PDCCH ALs may be used in different radio beams.

In some embodiments, the RAN node is caused to obtain information regarding UE link quality in a cell of the wireless communications system by transmitting at least one paging message to a plurality of UEs with different PDCCH and/or PDSCH signal configurations; and determining, based on a highest-rate signal configuration where the at least one paging message is successfully received, the information regarding the UE link quality.

In some embodiments, the RAN node is caused to obtain information regarding UE link quality in a cell of the wireless communications system by receiving, from a plurality of UEs, information regarding successful and/or unsuccessful reception and decoding of PDCCH and PDSCH.

In some embodiments, the RAN node is caused to obtain information regarding UE link quality in a cell of the wireless communications system by obtaining information regarding failed paging related to at least one UE; and determining, based on the obtained information, to adjust PDSCH transmission code rate.

In some embodiments, the RAN node is caused to update the paging transmission parameters by adjusting at least one of a paging PDCCH AL, PDSCH transmission code rate, TBS scaling, output power, cell shape and payload size. Different TBS scaling and/or output power may be used in different radio beams.

According to a seventh aspect, there is provided a CN node configured to perform the method according to the third aspect.

The CN node is configured for updating a paging configuration for at least one UE in a wireless communications system. The CN node comprises a processing circuitry and a memory circuitry. The memory circuitry storing computer program code which, when run in the processing circuitry, causes the CN node to obtain information associated with UE type of the at least one UE. The CN node is further caused to determine, based on the obtained information associated with UE type of the at least one UE, whether a current paging configuration used by the at least one UE is to be updated to an updated paging configuration for said at least one UE; and to update, based on the determination, the current paging configuration used by the at least one UE into the updated paging configuration for said at least one UE.

In some embodiments, the CN node is further caused to broadcast said updated paging configuration for said at least one UE.

In some embodiments, the CN node is caused to update the current paging configuration into an updated paging configuration by adjusting a length of a DRX cycle.

In some embodiments, the obtained information associated with UE type of the at least one UE comprises information associated with a service application of the at least one UE and, when it is determined that the current paging configuration is to be updated to an updated paging configuration due to that the service application has changed, or is to be changed, from enhanced eMBB to URLLC, the CN node is caused to adjust the length of the DRX cycle by decreasing a length of the DRX cycle.

According to an eight aspect, there is provided a UE configured to perform the method according to the fourth aspect.

The UE is configured for performing paging in a wireless communications system. The UE comprises a processing circuitry and a memory circuitry. The memory circuitry storing computer program code which, when run in the processing circuitry, causes the UE to receive, from a RAN node, an updated paging configuration and/or updated paging transmission parameters.

In some embodiments, the UE is further caused to respond to a received paging.

According to a ninth aspect, there is provided a computer program, comprising instructions which, when executed on a processing circuitry, cause the processing circuitry to carry out the method according to the first aspect, the second aspect, the third aspect and/or the fourth aspect.

According to a tenth aspect, there is provided a carrier containing the computer program of the ninth aspect, wherein the carrier is one of an electronic signal, optical signal, radio signal, or computer readable storage medium.

The various proposed embodiments herein provide a solution for adapting paging configuration by the network to simultaneously minimize network resource usage for paging and ensure that one or more specific conditions are met, e.g., paging response, latency requirements, network and/or UE power consumption, and false paging.

The various proposed embodiments herein further provide a solution for adapting paging signal transmission by the network to minimize PDCCH and PDSCH resource usage and their impact on data capacity in the network, as well as addressing Power Saving (PS) concerns of the UEs related to paging monitoring and reception.

The present disclosure allows reducing idle mode energy consumption for individual UEs without forcing suboptimal configurations on other UEs, and allows efficient network resource usage and adapting paging activity to UEs in the coverage area.

BRIEF DESCRIPTION OF THE DRAWINGS

These and other aspects, features and advantages will be apparent and elucidated from the following description of various embodiments, reference being made to the accompanying drawings, wherein:

FIG. 6 is a flowchart of an example method performed by a RAN node;

FIG. 8 is a flowchart of an example method performed by a RAN node;

FIG. 11 shows an example implementation of a RAN node;

FIG. 12 shows an example implementation of a RAN node;

FIG. 13 shows an example implementation of a CN node;

FIG. 14 shows an example implementation of a UE;

FIGS. 22 and 23 show example methods implemented in a communication system including a host computer, a base station and a user equipment.

DETAILED DESCRIPTION

Figure 1:
FIG. 1 illustrates an example of a DRX cycle.
Figure 2:
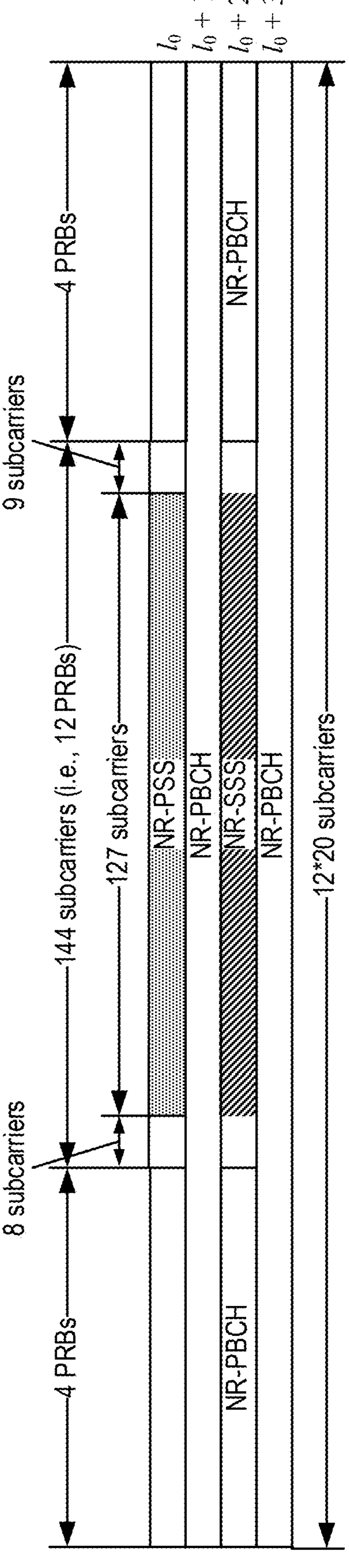
FIGS. 2 and 3 illustrate SSBs.
Figure 3:
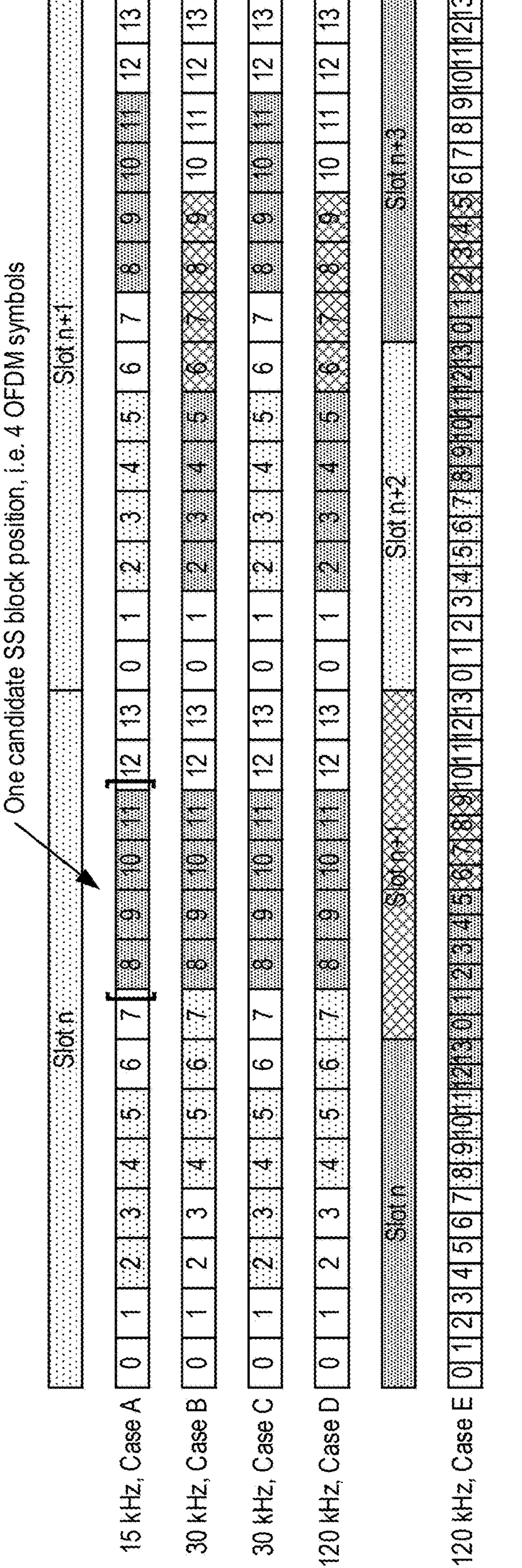
Figure 4:
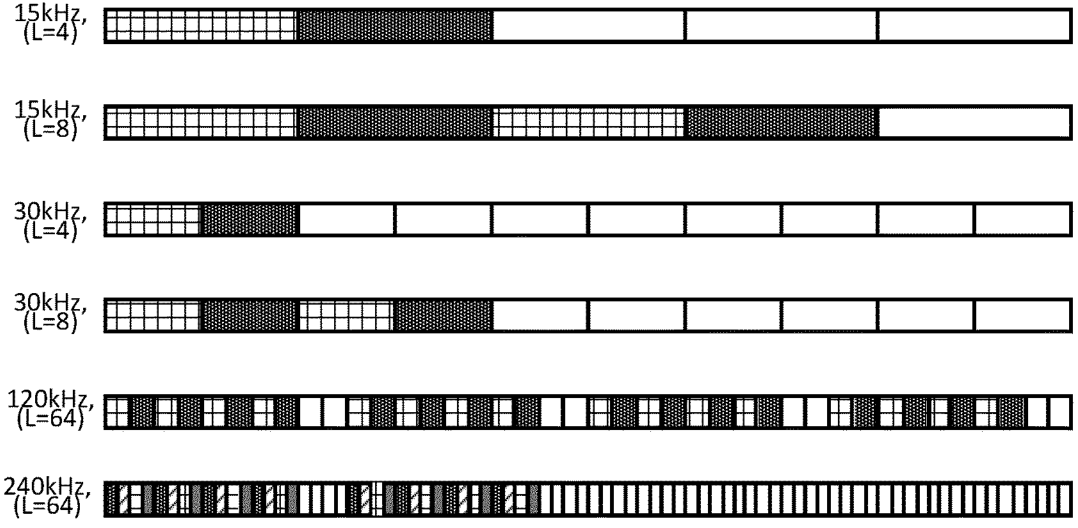
FIG. 4 shows how multiple SSB beams are distributed in time.
Figure 5:
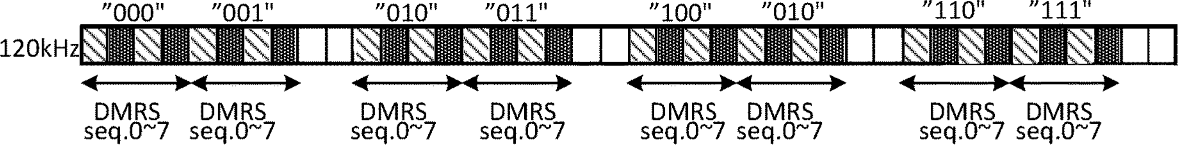
FIG. 5 shows the indication of SSB time index from 0 to 63.

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description. Furthermore, it should be appreciated that even if the present disclosure mainly is described with reference to 5G New Radio (NR), it is to be understood that the embodiments are not limited to 5G NR and that modifications and other variants are intended to be included within the scope of this disclosure.

The present disclosure relates to methods and apparatuses for adaptively changing paging configuration and/or transmission scheme. Embodiments herein are applicable to both RRC_IDLE and RRC_INACTIVE states, i.e. dormant states, and these are generally referred to as idle mode below.

In one of its aspects, the disclosure presented herein concerns a method in a RAN node for updating a paging configuration for at least one UE in a wireless communications system. The RAN node uses at least one radio beam for transmitting at least one paging message to said at least one UE. Thus, the updated paging configuration may be UE specific, or it may be cell-specific, and the RAN node may use one or a plurality of radio beams for transmitting said at least one paging message. The one or more radio beams may be sent from the same network node, the same transmission/reception point (TRP) or from different TRPs. These different TRPs may have the same cell identity.

Traditionally, a paging implementation in a NR cellular network relies on previously determined fixed configurations both for paging DRX and PO definition, e.g., DRX cycle, the number of PFs per DRX cycle, the number of POs per PFs, the number of beams, the PF offset, etc. Such a configuration, which is communicated to the UE by SI or Radio Resource Control (RRC) messages, is by default fixed, does not change frequently, and is also usually the same in different cells. This configuration may as such not be optimal for different conditions or for different types of UEs, especially when the different types of UEs are served by different radio beams, leading to both network and UE resource and power utilization inefficiencies.

The present disclosure provides mechanisms which allow and motivate the network to update the paging configuration based on one or more practical situations, and potentially provide different configurations in different cells or for different radio beams, or to different UEs, in order to optimize network resources and latency, network power consumption as well as UE power consumption, provided that one or more specific conditions are met.

With reference to the FIGS. 6, a first embodiment will now be described. FIG. 6 illustrates a method 600 in a RAN node 1100 for updating a paging configuration for at least one UE in a wireless communications system, wherein at least one radio beam is used to serve the at least one UE.

As seen in FIG. 6, the method 600 begins with step 610 of obtaining information regarding at least one paging condition. The at least one paging condition is associated with a current paging configuration for said at least one UE. The at least one paging condition comprises at least one of a false paging rate, latency, PDCCH load, and PDCCH and PDSCH imbalance.

In case the at least one paging condition comprises a false paging rate, the step 610 of obtaining information regarding at least one paging condition may further comprise step 615 of determining an average number of UEs paged per PO and a statistical ratio of paged UEs versus camping UEs. The average number of UEs may be determined based on a given time period, which is at the discretion of the RAN node, e.g., in terms of number of DRX cycles that the RAN node observed previously.

Figure 7:
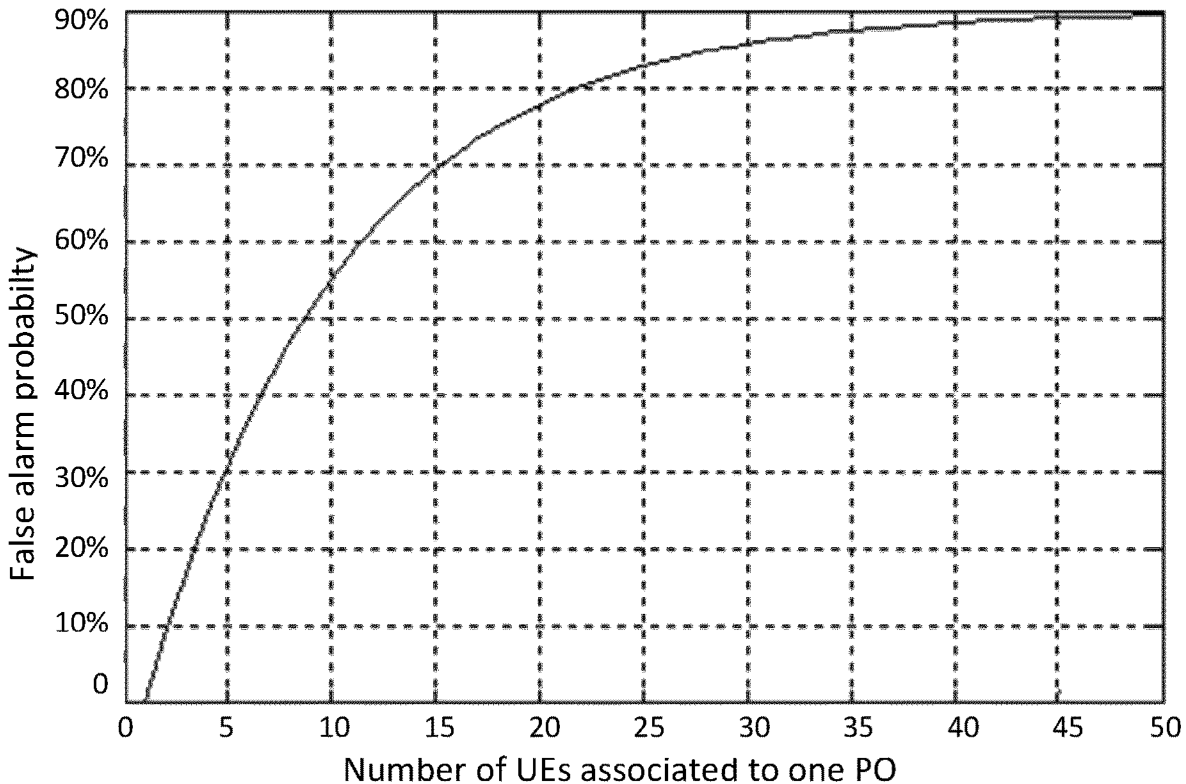
FIG. 7 shows an example of false paging rate per numbers of UEs associated to one PO.

For example, the RAN node may estimate the false paging rate based on an estimated number of UEs monitoring each PO, and an actual paging rate in the POs. The false paging rate may be estimated according to the following formula; $P=(1-R)(1-(1-R)^{N-1})$. P denotes the probability of false paging alarm. R denotes the paging rate for a UE and N denotes the number of UEs associated to the same PO. It may be assumed that different UEs are independent in paging. Accordingly, if 10 UEs share a PO and the paging rate for one UE is, for example, 10%, the resulting false paging rate is 55%. This is also illustrated in FIG. 7.

Alternatively, the step 610 of obtaining information regarding at least one paging condition may further comprise step 620 of tracking, during a time frame, or time window, a number of different paged UEs. For example, if the same five UEs are always paged, this may not be a big issue. However, if during this time frame, different UEs are paged, e.g. 50 different UEs, then this may imply that an update of the paging configuration may be preferred.

As illustrated in FIG. 6, the method 600 further comprises step 625 of determining whether the obtained information regarding the at least one paging condition exceeds a respective associated threshold. In some embodiments, said at least one paging condition may comprise at least two of a false paging rate, latency and PDCCH load, and each of these paging conditions may be associated with a respective threshold. In these embodiments, the method 600 may further comprise step 630 of determining an acceptable trade-off level between the at least two paging conditions based on the determination of whether the obtained information regarding the at least two paging conditions exceed respective associated thresholds. Thus, the obtained information regarding each of the at least two paging conditions may be compared against its associated threshold and a trade-off level is determined between the at least two paging conditions.

Thereafter, the method 600 comprises step 635 of updating, based on the determination, the current paging configuration into an updated paging configuration for said at least one UE.

In some embodiments, step 635 of updating the current paging configuration into an updated paging configuration may comprise step 640 of adjusting at least one of a number of PF per DRX cycle and a number of POs per PFs. In case the at least one paging condition comprises a false paging rate and it is determined that the false paging rate exceeds the corresponding threshold, the step 640 of adjusting at least one of the number of PF per DRX cycle and the number of POs per PFs may comprise step 645 of increasing at least one of the number of PFs per DRX cycle and the number of POs per PFs.

The choice of the number of POs may consider UE energy cost due to false paging, i.e. extra PDSCH decoding, versus UE energy cost due to extra awake time, i.e. PO offset to SSB (or other reference signal such as Tracking Reference Signal (TRS) or alike). A small PO to SSB time offset enables a higher level of energy saving in the UE due to a condensed radio-related activity timeline resulting in more total sleep time. For example, the RAN node may increase the number of POs if a specific condition is met, e.g., if the false paging rate goes above the specific threshold. In this way, the UE would wake up less frequent to save its energy.

Alternatively, or additionally, the choice of the number of POs may consider UE energy consumption impact from false paging. Although one PO may accommodate a larger number of UEs, this may also increase false paging probability, e.g. a UE detecting a paging PDCCH but not being targeted in paging records in the PDSCH. The number of POs may therefore be kept larger than the minimum possible and full paging capacity per PO may not be pursued. On the other hand, UE energy savings may be adversely affected by more POs since not all POs can have an advantageous placement, short offset, to closest previous SSB. This trade-off may be considered by the network.

The number of POs may be changed either through changing the number of PFs per DRX cycle or by changing the number of POs per PFs, or both. For example, the RAN node may determine to decrease the number of PFs such that the distance between POs and SSB or other potential Reference Signals (RSs), such as TRS, may be minimized leading to a higher energy saving possibility as outlined above. Accordingly, these may not be every frame, but e.g. every 2nd, every 4th etc. frame in order for the PO to be in vicinity of 20 ms SSB. Thus, the UE may go back to sleep faster after paging monitoring if it is not paged. For example, instead of one PO/frame in every frame, it may be changed to 2 POs/frame every-other frame so that the POs may be close to the TRS, when the TRS is there. Additionally, or alternatively, the RAN node may increase the number of POs per PF such that the UEs may be more distributed in order to reduce the false paging. Accordingly, the RAN node may configure PO locations to obtain a desired trade-off between latency and SSB-PO offset.

Furthermore, the RAN node may consider the network resource impact of the number of POs. A larger number of POs may lead to more paging transmissions, where each transmission caters to fewer potential UEs. The RAN node may reduce the number of POs when the network load is high and the PDCCH capacity may become limited. The RAN node may configure more POs when the PDCCH capacity is not limited.

In some embodiments, the RAN node may be aware that a UE is connected through different Subscriber Identity Modules (SIMs) but camping in the same idle mode frequency band. The RAN node may configure the POs such that the UE's different SIMs POs are partially, or completely, overlapping, or close to each other, so the UE may save power by avoiding multiple wake-ups during idle mode. For example, the RAN node may adjust the PF offset such that the POs are either overlapping or very close to each other. Additionally, the RAN node may configure and transmit the corresponding RSs, e.g., SSB, such that the UE may choose to use resources in one SIM for PO monitoring in the other SIM. Thereby, the wake-up time and power consumption may be reduced.

When beamforming is employed by a RAN node or a TRP, it may be important to consider optimization of the paging parameters in terms of which radio beams are used for paging. In some cases, UEs may not be uniformly distributed in a cell, and hence, it may consume unnecessary resources if the paging configuration caters only the worst UE, e.g., the 5-% UEs in terms of coverage. Therefore, the paging configuration may be updated/considered based on at least one of the number of beams used for paging, the shape of the beams (e.g., width of the beams), the power of the beams and the direction of the beams.

In some embodiments, the length of the POs (resulted by beam sweeping) may be configured or updated based on the number of beams used for the paging. The larger number of beams means that the UE may need to process multiple beams and thus, stay awake for a longer time. Thus, the RAN node may determine the number of beams per PO such that the number of beams may be minimized while a specific requirement, or set of requirements are met. The RAN node may have prior information regarding the approximate location of UEs it should page in a given PO. Therefore, the RAN node may not need to activate all the radio beams but only beams that cover the intended UEs to be paged in the PO. Alternatively, the network node may adjust the beam width to cover more UEs instead of sending multiple beams if the intended UEs to be paged are located in some directions that is covered by a wider beam. In order to compensate the loss of beamforming gain due to the use of wider beam, the RAN may optionally boost the transmit power and/or using more robust coding and modulation schemes when transmitting the paging message. The specific requirement, or set of requirements, may further comprise at least one of paging response, network load, UE power savings, network power savings, and so on. Accordingly, as also illustrated in FIG. 6, in case the at least one paging condition comprises a paging response rate, step 635 of updating the current paging configuration into an updated paging configuration may comprise step 650 of adjusting a number of beams used for the paging.

Additionally, or alternatively, step 635 of updating the current paging configuration into an updated paging configuration may comprise step 655 of adjusting at least one of beam power or beam width of the at least one beam used for the paging. Thus, the beam power of the at least one beam used for the paging may be adjusted or the beam width of the at least one beam used for the paging may be adjusted. Alternatively, both the beam power and the beam width of the at least one beam used for the paging may be adjusted.

The network may also benefit from a limited number of beams, as it then does not have to repeat paging in different beams. This may lead to saving resources as well as network energy consumption. For example, the RAN node may first configure only one beam for paging in the cell. If the paging response rate of the UEs remain beyond a specific threshold, e.g., 99%, the network may keep the configuration. However, if the paging response rate may fall below this threshold, the RAN node may add another beam, or replace one or more of the current beams. By replacing a beam, it is meant to reconfigure the current beam, such as change the shape of the beam and/or output power. Furthermore, if the paging response may fall below a second threshold, e.g., 95%, then still another beam may be added, or one or more of the current beams may be replaced, and so on.

Furthermore, the RAN node may decide to add a new beam based on several factors. For example, based on the UE's behaviour during connected mode, the RAN node may have a rough knowledge about the spatial/geographical distribution of the UEs within the cell. Thus, the RAN node may exploit this knowledge in order to decide which beams to select for paging.

Alternatively, the RAN node may decide the number of beams, and which ones to select, based on the UE's reported link quality during connected mode. For example, if the UE's, or for most or all UEs' in the cell, link quality is good, the number of beams may be less than when the UE's link quality is below a specific threshold.

Alternatively, the RAN node may decide the number of beams, and which ones to select, based on the UE's previous used configurations, e.g., which beam(s) that were used for the last successful paging. The information may be stored in the RAN node or the information may be stored in a CN node and communicated to the RAN node.

In some embodiments, the change in the number of beams used per PO may be associated with the number of SSB beams. In a type D Quasi CoLocation (QCL) arrangement, the RAN node may transmit an SSB beam matching spatial properties of the paging PDCH beam.

In some embodiments, the at least one paging condition may comprise a paging priority. In these embodiments, the step 635 of updating the current paging configuration into an updated paging configuration may comprise step 660 of postponing paging records that are below the respective associated threshold to a next paging occasion.

When the RAN node may see a need for adapting the coding format of PDSCH, it may remove paging records, UE identities, from the PDSCH payload in favour of more coding redundancy bits. According to this approach, the RAN node may remove, pre-empt, paging records with lowest priority, received from the CN node, and/or ones that may require excessive/inefficient encoding and postpones the paging message until next paging occasion.

Alternatively, or in conjunction with considering priorities, the network may consider a pre-emption limit, x times, for each record and prioritize records that have been thrown out more than the limit. Depending on the network paging load, e.g. low or moderate load, the network may choose to maintain the number of POs and accept that there will be a certain delay in paging response as the paging records are postponed. However, in case the delay exceeds a certain level, the network may choose to introduce extra POs. Conversely, the network may choose to remove POs when the conditions for excessive encoding of PDSCH has ceased. It may be noted that each PO is associated with a PDCCH overhead and hence, it may not be desirable for the network to have many POs configured constantly. The network may inform all the UEs through broadcast system information that new, or fewer, POs are to be used and the UEs may have to recalculate which one they should listen to.

The network may adjust the number of POs configured in a cell depending on an expected number of paging records accommodated in the PDSCH, which in turn depending on the PDSCH TFs previously determined, and the current, or expected, paging load in the system.

The network may adapt the number of POs to ensure sufficient paging capacity given the maximal number of paging records in paging PDSCH. For example, if TBS scaling is used and payload is reduced, the number of POs may be increased. The estimated required paging capacity may be estimated based on the observed or anticipated paging load, data traffic load, etc. Up to four POs may be associated with each frame. The POs locations may be indicated with a symbol index for PDCCH monitoring.

PO allocation changes may follow changes in available paging capacity and changes in the need for paging. In one embodiment, it may preferably be tied to the SI update rate adopted in the deployment, e.g. a few hours. The update rate is limited since all UEs need to be informed during one modification period, on the order of one or a few DRX periods, causing a signalling overhead for each update. However, faster adaptation may apply e.g. to obtain a rapid response to needs of URLLC UEs.

In one embodiment, the RAN node may utilize custom PO allocation via tailored UE ID allocation. The UEs may be allocated to different POs, where each PO may have an optimized PDCCH AL and PDSCH TF. For example, URLLC devices that need lower coding rate for robustness, may be grouped together, or UEs with common good or poor link quality may be grouped together.

In another embodiment, the RAN node may not specifically allocate UEs of various types to different POs. In case the RAN node notes that a paging record belonging to a specific type of UE, which may benefit from low Modulation and Coding Scheme (MCS)—e.g. an ultra-reliable type of UE, and is to be multiplexed with other UEs, which are not in need of low coding rate, the coding rate of the PDSCH may still be adapted to the lowest coding rate. In another embodiment, in case the RAN node notes that several, e.g. more than x, high-MCS UEs are about to be multiplexed with a low-MCS UE, the RAN node may choose to page the UEs in separate POs instead rather than using low MCS for all UEs and thereby offloading PDSCH for other transmission.

When the RAN node has updated a current paging configuration to an updated paging configuration, the method 600 may further comprise, as seen in FIG. 6, step 670 of transmitting, to said at least one UE, at least one paging message in said at least one beam in accordance with the updated paging configuration.

According to a second aspect of the present disclosure, there is provided a method 800 in a RAN node 1200 for updating paging transmission parameters in a wireless communications system.

Generally, a paging implementation in a NR cellular network relies on previously determined fixed configurations for both PO definition and paging signal transmission. These are typically dimensioned to handle worst-case paging load and/or link conditions at coverage limits; often not considering specific deployment aspects, e.g. large or small cells, amount of traffic and UEs etc. Due to lack of reliable criteria, adaptation of paging operation to local and current conditions has been a challenge.

The present disclosure provides a solution to determine necessary, but not excessive, signalling robustness for PDCH/PDSCH transmission on a per-PO basis, based on determined link quality limits for the UEs actually paged in a given PO.

The payload size in the paging PDSCH—the number of paging records or the number of UEs that may be paged simultaneously—depends on the selected code rate and/or the transport block size. This in turn may affect the number of POs required to handle the offered paging load. The network may therefore also adjust, or update, the number of POs to save paging resources. The adjustment/update is done in a time scale at the discretion of the RAN node. Each time the RAN node adjust/update the configuration, a SI update has to be broadcast in the cell, which all the UEs should read. Therefore, the RAN node should consider, for example, a trade-off between signalling overhead and potential UE energy savings before adjusting/updating its current configuration. Other considerations may also be taken into account by the RAN node, and these are illustrated in the present disclosure.

The solutions provided herein include considerations for achieving favourable, or selectable, trade-offs of UE power savings, PDCCH/PDSCH resource allocation and performance, and paging capacity in the system.

With reference to the FIG. 8, a first embodiment according to this second aspect will now be described. FIG. 8 illustrates a method 800 in a RAN node 1200 for updating paging transmission parameters in a wireless communications system.

As illustrated in FIG. 8, the method 800 comprises step 810 of obtaining information regarding UE link quality in a cell of the wireless communications system. The method 800 thereafter comprises step 855 of updating, based on the obtained information regarding UE link quality, the paging transmission parameters. The step 855 of updating the paging transmission parameters may comprise step 865 of adjusting at least one of a paging PDCCH AL, PDSCH transmission code rate, TBS scaling, output power, cell shape and payload size. For example, different TBS scaling and/or output power may be used in different beams.

The obtained information regarding UE link quality may relate to an average UE link quality or to a worst case UE link quality in the cell. The RAN node may determine the link quality for UEs camping, or potentially camping, in the cell.

The method 800 may further comprise, in some embodiments, step 870 of transmitting at least one paging message to at least one UE according to the updated paging transmission parameters.

As illustrated in FIG. 8, the step 810 of obtaining information regarding UE link quality in a cell of the wireless communications system may comprise step 815 of determining the UE link quality based on reported RRM measurements. The RRM measurements were made when the UEs were in a connected mode, in conjunction with handovers and/or connection loss. The RAN node may track typical or worst-case UE link quality in the cell e.g. based on the reported RRM measurements in connected mode, e.g. in conjunction with HandOver (HO) preparations in RRM mobility. The measurement results may indicate typical and worst-case conditions for UEs in the cell in HO conditions, i.e. in cell-edge regions. An advantage is that this will not imply an extra cost as it is the already ongoing connected mode measurements that may be used for tracking the typical cell coverage. Alternatively, other SSB, CSI-RS or SRS-based measurement reports from connected UEs may be used to determine the worst-case link quality level. This approach may allow to distinguishing different worst-case link conditions e.g. large and small-cell deployments. Furthermore, in a multi-sector/multi-beam deployment, this approach may enable the RAN node to track the typical and worst-case conditions per sector/beam. Based on this information, the RAN node may then tune the paging, and broadcast system information/multicast, PDCCH aggregation level and PDSCH coding rate per transmission, per cell/sector/beam, so that UEs potentially in worst-case link conditions may be able to decode the contents of the transmission.

In a related embodiment, the RAN node may collect and store link quality information for specific UEs while in the connected mode. The RAN node may also report the collected information to a CN which may be retrieved later. The RAN node may establish that a UE is stationary based on repetitive connections with similar link quality, SSB beam choice, and/or position estimates. The quality estimates may then be used by the RAN node to approximate actual link conditions for these UEs when paged in idle mode.

As further illustrated in FIG. 8, the step 810 of obtaining information regarding UE link quality in a cell of the wireless communications system may alternatively comprise step 830 of transmitting at least one paging message to a plurality of UEs with different PDCCH and/or PDSCH signal configurations. Thereafter, the method 800 may further comprise step 835 of determining, based on a highest-rate signal configuration where the at least one paging message is successfully received, the information regarding the UE link quality. Thus, the RAN node may test-page worst-case UEs in the wireless communications system to establish coverage limit criteria. A UE known to be in poor conditions based on connected-mode reports may be released and paged with different PDCCH/PDSCH signal configurations to determine the reception limit. The reception limit may be estimated per cell/sector/beam. Based on the highest-rate signal configuration where the paging is successfully received, the actual link quality may be determined.

Additionally, link quality, or a need to change link quality assumptions, may be inferred from changes in paging reception. In some cases, the detected changes may be used directly to incrementally modify the current PDCCH/PDSCH transmission formats.

The step 810 of obtaining information regarding UE link quality in a cell of the wireless communications system may alternatively comprise, as illustrated in FIG. 8, step 850 of receiving, from a plurality of UEs, information regarding successful and/or unsuccessful reception and decoding of PDCCH and PDSCH. For example, cell-edge UEs may inform the RAN node that PDCCH is received and decoded successfully, informing the RAN node that there is a paging message but PDSCH cannot be decoded. This is an indication of the performance inequality between PDCCH/PDSCH transmissions or the performance inequality is more than the UE could handle. This information may be provided to the RAN node by extending the Minimization of Drive Test (MDT) framework. For example, the UE may record such PDSCH decoding failure information, despite PDCCH success, per location, cell/sector/beam, including time instance, decoded DCI contents about PDSCH, e.g. what MCS was indicated in PDCCH. The UE may then provide the information to the RAN node either immediately or when asked for. Alternatively, such information may be conveyed to the RAN node through existing standards mechanism either in a proprietary manner or configurable via a configuration parameter introduced in the specifications. A UE may, if configured or always proprietarily, respond to the PDCCH page anyways despite that PDSCH was not decoded. The UE does not know if it is actually paged, i.e. does not know whether its paging identity was actually included in the PDSCH. In case the RAN node receives paging responses from UEs that the RAN node did not actually page, it may derive that PDCCH was correctly decoded by the UEs, but not the PDSCH. Alternatively, the paging response message may be extended (e.g. by extending any of the messages involved in connection setup procedure) with an indicator informing the network whether the UE actually decoded the PDSCH before responding. In one embodiment, the indicator may be set by the UE during a connection setup procedure as a result of traffic originated/initiated by the UE rather than that of in paging response.

Step 810 of obtaining information regarding UE link quality in a cell of the wireless communications system of method 800 may alternatively comprise, as also illustrated in FIG. 8, step 840 of obtaining information regarding failed paging related to at least one UE. The method 800 may then further comprise step 845 of determining, based on the obtained information, to adjust PDSCH transmission code rate, e.g., in terms of MCS and/or TBS and/or AL.

The RAN node may track failed paging rates, and may adjust PDSCH coding if robustness has decreased. The failed paging may be tracked by noting that the UE has not responded to paging in a specific cell. For example, the RAN node may adjust the paging PDCCH/PDSCH transmission, e.g. AL or MCS or TBS, based on the latest known information of the worst case UE that needs to be paged in a PO (the worst case UE may be the worst UE in the cell/sector/beam). This may be based on, e.g., CSI/SRS measurements and reporting from the connected mode. In case the at least one UE has responded to the paging, e.g. moved to the connected mode, within the same cell, particularly if the paging message is not an escalated one, the RAN node may know that the UEs are in good channel conditions. However, if at least one UE has not responded to the paging, then the RAN node may know after one or multiple paging attempts that the channel conditions may have deteriorated for at least the specific UE. The RAN node may send a more robust paging message in the next PO, e.g., a higher AL for PDCCH, or a lower MCS index for PDSCH. If the at least one UE responds to the paging, the RAN node may then establish the new mode as the updated channel quality. Furthermore, the RAN node may update its paging best beam based on the response from the UE. For example, if the UE has responded in a different beam than the beam considered as the best one by the RAN node, the RAN node may update the best beam for the corresponding UE(s).

In other embodiments, particularly if the at least one UE operates in higher frequencies, e.g., FR2, the RAN node may acquire the channel knowledge by, for example, considering the measurements and reporting of other connected UEs which are in QCL with that specific UEs.

In case the RAN node does not receive a paging response in the cell that the UE was camped before going to idle mode, but in a different cell, the RAN node may update the radio link quality estimation of the UE for the new cell.

If a radio link quality estimate is not available for a UE targeted in a current PO, the RAN node may assume the link quality to be the cell/sector/beam worst-case.

Regarding PDCCH transmission, the RAN node may determine the PDCCH AL for the paging PDCCH transmission in a specific PO by considering the set of UEs to be paged in that PO.

If radio link quality estimates are available for all UE to be paged, the worst link quality may be used as a guideline. If no UE-specific estimate is available for some UEs, the cell/sector/beam worst-case estimate may be used as a guideline.

In some embodiments, the RAN node may consider a specific paging response requirement for setting the PDCCH AL, e.g., worst case UE Block Error Rate (BLER), or average BLER over all the UEs within the same PO. In the first case, the RAN node may set the AL sufficiently high such that the worst case UE BLER is lower than a specific threshold, e.g., 1%. In the second case, an average BLER among all the UEs within a PO may be considered to set the AL. That is, an AL may be chosen such that the average BLER among all the UEs within a PO should be lower than the threshold. In order for the RAN node to decide which mode to use, the RAN node may consider a potential number of required escalated paging (i.e., paging in a broader area possibly covering multiple cells) to reach the worst case UEs as a criterion. Thus, if the potential number of required escalated paging due to failed paging for some UEs (e.g., worst case UE in a cell/sector/beam) is more than a specific amount, e.g., 2, then the RAN node may need to update the PDCCH AL used for sending the initial paging message. . . . However, if it is only one more escalated paging, then the RAN node may adapt the PDCCH AL based on the average case.

In some embodiments, step 810 of obtaining information regarding UE link quality in a cell of the wireless communications system of method 800 may comprise, as also illustrated in FIG. 8, step 820 of transmitting at least one paging message to a plurality of UEs at a specific PDCCH AL. If more than a threshold value of the plurality of UEs responded to the at least one paging message after a maximum number of paging attempts, the method 800 may further comprise step 825 of determining that the paging transmission parameters is to be updated by lowering the specific PDCCH AL. The step 855 of updating the paging transmission parameters may then comprise, for example, step 860 of performing the determined lowering of the PDCCH AL. Different PDCCH ALs may be used in different beams.

The above may be used if the RAN node does not have knowledge about the radio link quality, the RAN node may then start paging the UEs from the higher AL, e.g., 16 or 8. If a specific percentage of the UEs, e.g., 99%, responded to the paging after a maximum number of paging attempts, e.g., 2, then the RAN node may decide to lower the AL, e.g., to 4. If the specific criteria as in the described example is still satisfied, the RAN node may keep the current AL or make it even lower. Alternatively, the RAN node may start from a low AL, e.g., 4, and increase it accordingly if the specific condition(s) as in the example is not satisfied.

When the RAN node pages the UE in one or more beam, the RAN node may use different ALs in different beams. For example, the RAN node may use a lower AL in the beam with higher radio link quality (e.g., a beam previously reported by the UE with good channel qualities), but a higher one in lower radio link quality beams (e.g., beams adjacent to the good beam(s) which may potentially cover the UE). The RAN node may additionally use different output power and/or beam shape in different beams. For example, the RAN node may use a wider beam that covers a wider area to page the UE instead of using several narrower beams covering the same area. Wider beams may have less beamforming gain, and therefore higher output power may be used to compensate the lost gain due to the use of wider beams. With the same beam shape, higher output power lead to better coverage, thereby fewer beams may be used instead. Fewer beams may lead to less sweep in time, which may lead to less power and resources consumed by the RAN node and more power saved in the UE.

Regarding PDSCH transmission, the RAN node may determine the PDSCH transport format, such as modulation, code rate, transport block size and scaling, in a specific PO, considering the set of UEs to be paged in that PO.

Similar to PDCCH, if radio link quality estimates are available for all UE to be paged, the lowest radio link quality may be used as a guideline. If no UE-specific estimate is available for some UEs, the cell/sector/beam worst-case estimate may be used as a quality guideline.

The RAN node may determine the number of paging records that can be carried in the PDSCH given the required transport format (TF) and the available PRBs for PDSCH transmission. As a result, more PRBs may be transmitted if targeting UEs that all recently have confirmed good radio link quality, or conversely fewer PRBs if low-quality UEs must be accommodated.

In case the dominant link quality is low, TBS scaling may be used for PDSCH transmission to increase robustness. This may be performed to ensure successful reception in the first place, or to enable simpler processing in UEs, e.g. to reduce the number of SSBs required to support PDSCH reception, for example for accurate T/F offset estimation.

In one embodiment, the RAN node may start paging PDSCH transmission from the most robust configuration, e.g., the highest TBS, and lowest MCS index, and so on. If the paging response satisfies one or more specific conditions, e.g., UE paging response is more than 99% after maximum two paging attempts, the RAN node may decide to lower the robustness, e.g., lower the TBS, or increase MCS index. Alternatively, the RAN node may choose to start from the least robust PDSCH configuration, or from an arbitrary choice, and adjust according to one or more specific conditions as in this example embodiment.

The previously described examples may be extended to the case where the UE is configured with multiple beams for paging. E.g., the RAN node may decide to start from a less robust PDSCH configuration in the best quality beam, and/or more robust one in the less quality beams, and then adjust accordingly. The RAN node may decide, for example, to do not escalate paging in the less quality beams anymore, and just increase the paging robustness in the best-known quality beam, or a subset of best-known quality beams.

Described approaches for PDCCH/PDSCH transmission adaptation based on minimum radio link quality in the cell may be used also for tuning transmission in other broadcast channels, e.g. SI transmission.

According to a third aspect of the present disclosure, there is provided a method 900 in a CN node 1400 for updating a paging configuration for at least one UE in a wireless communications system.

Figures 9, 10:
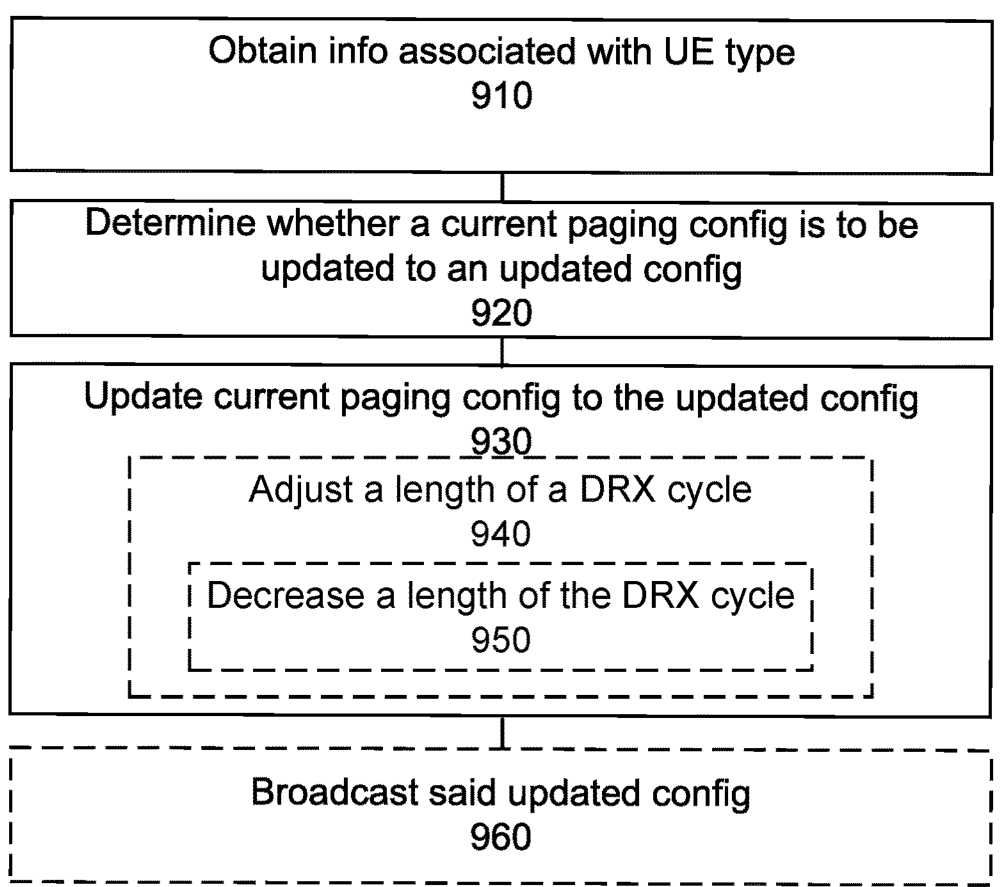
FIG. 9 is a flowchart of an example method performed by a CN node.
FIG. 10 is a flowchart of an example method performed by a UE.

With reference to the FIG. 9, a first embodiment will now be described. As seen in FIG. 9, the method 900 comprises step 910 of obtaining information associated with UE type of the at least one UE. The method 900 further comprises step 920 of determining, based on the obtained information associated with UE type of the at least one UE, whether a current paging configuration used by the at least one UE is to be updated to an updated paging configuration for said at least one UE. The method 900 further comprises step 930 of updating, based on the determination, the current paging configuration used by the at least one UE into the updated paging configuration for said at least one UE.

As further illustrated in FIG. 9, the step 930 of the method 900 may comprise step 940 of adjusting a length of a DRX cycle. For example, if the obtained information associated with UE type of the at least one UE comprises information associated with a service application of the at least one UE and it is determined that the current paging configuration is to be updated to an updated paging configuration due to that the service application has changed, or is to be changed, from eMBB to URLLC, the step 940 of adjusting the length of the DRX cycle may comprise step 950 of decreasing a length of the DRX cycle The method 900 may further comprise step 960 of broadcasting said updated paging configuration for said at least one UE.

The network may set the DRX cycle through the SI broadcast for all the UEs within the cell in the same way. For example, the network may consider an acceptable level of latency as the requirement to set the DRX cycle, e.g., the latency from the time to decide to page the UE until the UE is back to connected is less than T ms. The network may also consider other criteria, e.g., paging PDCCH/PDSCH capacity, the paging rate, UE/network power consumption, etc.

The network may decide to configure the default paging DRX cycle through SI based on the service application of the majority of the UEs. For example, if the majority of UEs are eMBB, then the paging DRX cycle may be determined based on eMBB Service Level Agreements (SLAs). However, if the majority of UEs are Redcap, the network may decide to prioritize their requirements, and so on. Alternatively, the network may configure the paging in a cell based on most stringent SLAs estimated to be present in the cell.

Alternatively, the network may decide to configure UE specific DRX cycle for specific UEs, or specific group of UEs, through NAS or RRC signalling depending on if the UE is in idle or inactive mode. For example, if a UE's current service application is eMBB, it follows the default SI based configuration. Nevertheless, the UE service application may change to URLLC, or be expected to change to URLLC, and thus, the network may decide to configure e.g., a shorter DRX cycles for one or more UEs. The network may reconfigure the UEs paging DRX cycle UE specifically with higher layer signalling methods described above. Alternatively, the UE's current service application may change from eMBB to Redcap. Thus, the network may want to only change one or more UEs paging DRX cycle from the default mode to another one, e.g., a longer DRX such as from 1.28 sec to 2.56 sec.

In case the majority of the UEs can tolerate a certain delay, the network, according to one example, may configure a longer DRX cycle to reduce the probability of false paging. For example, assume that 4 POs/frame initially were configured together with a DRX cycle of 1.28 sec. With this configuration there are 512 POs (128 frames*4POs) that the UEs may be distributed amongst. If the network observes that too many UEs are being allocated (i.e. are monitoring) per PO (high false paging rate), the network may then reconfigure the DRX cycle to 2.56 sec giving a total of 1024 POs that the UEs may be distributed amongst. As previously described, this may be observed by using an average number of UEs paged per PO and statistical ratio of UEs paged vs. UEs camping or by tracking the number of different UEs that are paged during certain time frame. The network may estimate the number of UEs monitoring per PO based on UEs paged per PO and an estimated paged-to-monitoring ratio from earlier statistics. By increasing the DRX length, the false paging probability may be lowered at the cost of latency when paged. With an increased DRX cycle, there will be more POs that the UEs are distributed among, e.g. if there were an infinite amount of POs each UE would get its own PO.

By reconfiguring a UE specific DRX cycle, the network may achieve the effect that the UE is moved away from its current PO to another PO in order to e.g., minimize network resources and/or reduce false paging.

The embodiments described herein may also be mixed and/or may be selected based on the desired trade-off. For example, false paging reduction for a UE may be achieved by increasing the number of POs per time unit (per unchanged DRX cycle or per PF), whereby the UE latency performance is not affected but the network PDCCH load is increased. Alternatively, the false paging reduction for a UE may also be achieved by increasing the number of POs by increasing the DRX cycle length and spreading UEs our over more POs, whereby network resources are not increased but the UE paging latency is extended. The first approach may be desirable in low-load scenarios and the second one in high-load scenarios or when UEs in the system are not latency-sensitive.

According to a fourth aspect of the present disclosure, there is provided a method 1000 in a UE 1400 for performing paging in a wireless communications system.

With reference to the FIG. 10, a first embodiment will now be described. As seen in FIG. 10, the method 1000 comprises step 1010 of receiving, from a RAN node 1100, 1200, an updated paging configuration and/or updated paging transmission parameters. Alternatively, the updated paging configuration may be received from a CN node. As further seen in FIG. 10, the method 1000 may further comprise step 1020 of responding to a received paging.

According to a fifth aspect, there is provided a RAN node configured to perform the method 600 according to the first aspect.

The RAN node is now going to be described with reference to FIG. 11. The RAN node 1100 may be used in, but are not limited to, a wireless communication system.

The RAN node 1100 is configured for updating a paging configuration for at least one UE in a wireless communications system. The RAN node 1100 uses at least one beam for transmitting at least one paging message to said at least one UE. As illustrated in FIG. 11, the RAN node 1100 comprises a processor, or a processing circuitry 1110, and a memory, or a memory circuitry 1120.

Additionally, or alternatively, the RAN node 1100 may further comprise a receiver, or a receiving circuitry 1130, configured to receive data from other apparatuses, such as the UE 1400, the RAN node 1200 or the CN node 1300.

Additionally, or alternatively, the RAN node 1100 may further comprise a transmitter, or a transmitting circuitry 1140, configured to transmit data to other apparatuses, such as the UE 1400, the RAN node 1200 or the CN node 1300.

The memory circuitry 1120 stores computer program code which, when run in the processing circuitry 1110, causes the RAN node 1100 to obtain information regarding at least one paging condition. The at least one paging condition is associated with a current paging configuration for said at least one UE 1400. The at least one paging condition comprises at least one of a false paging rate, latency, PDCCH load, and PDCCH and PDSCH imbalance. The RAN node 1100 is further caused to determine whether the obtained information regarding the at least one paging condition exceeds a respective associated threshold; and to update, based on the determination, the current paging configuration into an updated paging configuration for said at least one UE 1400.

Thus, the RAN node 1100 according to the present disclosure reduces idle mode energy consumption for individual UEs without forcing suboptimal configurations on other UEs. The RAN node 1100 further allows efficient network resource usage and adapting paging activity to UEs in the coverage area.

In some embodiments, the RAN node 1100 may further be caused to transmit, to said at least one UE 1400, at least one paging message in said at least one beam in accordance with the updated paging configuration.

In some embodiments, the at least one paging condition comprises a false paging rate and the RAN node 1100 may further be caused to obtain information regarding at least one paging condition by determining an average numbers of UEs pages per PO, and a statistical ratio of paged UEs versus camping UEs. Alternatively, the RAN node 1100 may further be caused to obtain information regarding at least one paging condition by tracking, during a time frame, a number of different paged UEs.

In some embodiments, the RAN node 1100 may further be caused to update the current paging configuration into an updated paging configuration by adjusting at least one of a number of PF per DRX cycle and a number of POs per PFs. For example, when the at least one paging condition comprises the false paging rate and when it is determined that the false paging rate exceeds the corresponding threshold, the RAN node 1100 may further be caused to adjust at least one of the number of PF per DRX cycle and the number of POs per PFs by increasing at least one of the number of PFs per DRX cycle and the number of POs per PFs.

In some embodiments, the at least one paging condition comprises a paging response rate and the RAN node 1100 may be caused to update the current paging configuration into an updated paging configuration by adjusting a number of beams used for the paging.

In some embodiments, the RAN node 1100 may be caused to update the current paging configuration into an updated paging configuration by adjusting at least one of beam power or beam width of the at least one beam used for the paging.

In some embodiments, the at least one paging condition comprises a paging priority and the RAN node 1100 may be caused to update the current paging configuration into an updated paging configuration by postponing paging records that are below the respective associated threshold to a next paging occasion.

In some embodiments, the at least one paging condition comprises at least two of a false paging rate, latency and PDCCH load and the RAN node 1100 may further be caused to determine an acceptable trade-off level between the at least two paging conditions based on the determination of whether the obtained information regarding the at least two paging conditions exceed respective associated thresholds.

According to a sixth aspect, there is provided a RAN node configured to perform the method 800 according to the second aspect.

The RAN node is now going to be described with reference to FIG. 12. The RAN node 1200 may be used in, but are not limited to, a wireless communication system.

The RAN node 1200 is configured for updating paging transmission parameters in a wireless communications system. As illustrated in FIG. 12, the RAN node 1200 comprises a processor, or a processing circuitry 1210, and a memory, or a memory circuitry 1220.

Additionally, or alternatively, the RAN node 1200 may further comprise a receiver, or a receiving circuitry 1230, configured to receive data from other apparatuses, such as the UE 1400, the RAN node 1100 or the CN node 1300.

Additionally, or alternatively, the RAN node 1200 may further comprise a transmitter, or a transmitting circuitry 1240, configured to transmit data to other apparatuses, such as the UE 1400, the RAN node 1100 or the CN node 1300.

The memory circuitry 1220 stores computer program code which, when run in the processing circuitry 1210, causes the RAN node 1200 to obtain information regarding UE link quality in a cell of the wireless communications system; and to update, based on the obtained information regarding UE link quality, the paging transmission parameters.

Thus, the RAN node 1200 according to the present disclosure reduces idle mode energy consumption for individual UEs without forcing suboptimal configurations on other UEs. The RAN node 1200 further allows efficient network resource usage and adapting paging activity to UEs in the coverage area.

In some embodiments, the obtained information regarding UE link quality may relate to an average UE link quality or to a worst case UE link quality in the cell.

In some embodiments, the RAN node 1200 may further be caused to transmit at least one paging message to at least one UE 1400 according to the updated paging transmission parameters.

In some embodiments, the RAN node 1200 may be caused to obtain information regarding UE link quality in a cell of the wireless communications system by determining the UE link quality based on reported RRM measurements. The RRM measurements were made when the UEs were in a connected mode, in conjunction with handovers and/or connection loss.

In other embodiments, the RAN node 1200 may be caused to obtain information regarding UE link quality in a cell of the wireless communications system by transmitting at least one paging message to a plurality of UEs at a specific PDCCH AL. If more than a threshold value of the plurality of UEs responded to the at least one paging message after a maximum number of paging attempts, the RAN node 1200 may be caused to determine that the paging transmission parameters is to be updated by lowering the specific PDCCH AL. The RAN node 1200 may then be caused to update the paging transmission parameters by performing the determined lowering of the PDCCH AL. Different PDCCH ALs may be used, for example, in different beams.

In other embodiments, the RAN node 1200 may be caused to obtain information regarding UE link quality in a cell of the wireless communications system by transmitting at least one paging message to a plurality of UEs with different PDCCH and/or PDSCH signal configurations, and by determining, based on a highest-rate signal configuration where the at least one paging message is successfully received, the information regarding the UE link quality.

In other embodiments, the RAN node 1200 may be caused to obtain information regarding UE link quality in a cell of the wireless communications system by receiving, from a plurality of UEs, information regarding successful and/or unsuccessful reception and decoding of PDCCH and PDSCH.

In other embodiments, the RAN node 1200 may be caused to obtain information regarding UE link quality in a cell of the wireless communications system by obtaining information regarding failed paging related to at least one UE 1400; and by determining, based on the obtained information, to adjust PDSCH transmission code rate.

In some embodiments, the RAN node 1200 may be caused to update the paging transmission parameters by adjusting at least one of a paging PDCCH AL, PDSCH transmission code rate, TBS scaling, output power, cell shape and payload size. For example, different TBS scaling and/or output power are used in different beams.

According to a seventh aspect, there is provided a CN node configured to perform the method 900 according to the third aspect.

The CN node is now going to be described with reference to FIG. 13. The CN node 1300 may be used in, but are not limited to, a wireless communication system.

The CN node 1300 is configured for updating a paging configuration for at least one UE 1400 in a wireless communications system. As illustrated in FIG. 13, the CN node 1300 comprises a processor, or a processing circuitry 1310, and a memory, or a memory circuitry 1320.

Additionally, or alternatively, the CN node 1300 may further comprise a receiver, or a receiving circuitry 1330, configured to receive data from other apparatuses, such as the UE 1400, the RAN node 1100 or the RAN node 1200.

Additionally, or alternatively, the CN node 1300 may further comprise a transmitter, or a transmitting circuitry 1340, configured to transmit data to other apparatuses, such as the UE 1400, the RAN node 1100 or the RAN node 1200.

The memory circuitry 1320 stores computer program code which, when run in the processing circuitry 1310, causes the CN node 1300 to obtain information associated with UE type of the at least one UE 1400 and to determine, based on the obtained information associated with UE type of the at least one UE 1400, whether a current paging configuration used by the at least one UE 1400 is to be updated to an updated paging configuration for said at least one UE 1400. The CN node 1300 is further caused to update, based on the determination, the current paging configuration used by the at least one UE 1400 into the updated paging configuration for said at least one UE 1400.

In some embodiments, the CN node 1300 may further be caused to broadcast said updated paging configuration for said at least one UE 1400.

In some embodiments, the CN node 1300 may be caused to update the current paging configuration into an updated paging configuration by adjusting a length of a DRX cycle. For example, the obtained information associated with UE type of the at least one UE 1400 comprises information associated with a service application of the at least one UE 1400 and when it is determined that the current paging configuration is to be updated to an updated paging configuration due to that the service application has changed, or is to be changed, from eMBB to URLLC, the CN node 1300 may be caused to adjust the length of the DRX cycle by decreasing a length of the DRX cycle.

According to an eight aspect, there is provided a UE configured to perform the method 1000 according to the fourth aspect.

The UE is now going to be described with reference to FIG. 14. The UE 1400 may be used in, but are not limited to, a wireless communication system.

The UE 1400 is configured for performing paging in a wireless communications system. As illustrated in FIG. 14, the UE 1400 comprises a processor, or a processing circuitry 1410, and a memory, or a memory circuitry 1420.

Additionally, or alternatively, the UE 1400 may further comprise a receiver, or a receiving circuitry 1430, configured to receive data from other apparatuses, such as the RAN node 1100, the RAN node 1200 or the CN node 1300.

Additionally, or alternatively, the UE 1400 may further comprise a transmitter, or a transmitting circuitry 1440, configured to transmit data to other apparatuses, such as the RAN node 1100, the RAN node 1200 or the CN node 1300.

The memory circuitry 1420 stores computer program code which, when run in the processing circuitry 1410, causes the UE 1400 to receive, from a RAN node 1100, 1200, an updated paging configuration and/or updated paging transmission parameters.

In some embodiments, the UE 1400 may further be caused to respond to the received paging.

According to a ninth aspect, there is provided a computer program, comprising instructions which, when executed on a processing circuitry, cause the processing circuitry to carry out the method according to the first aspect, the second aspect, the third and/or the fourth aspect.

According to a tenth aspect, there is provided a carrier containing the computer program of the ninth aspect, wherein the carrier is one of an electronic signal, optical signal, radio signal, or computer readable storage medium.

Figure 15:
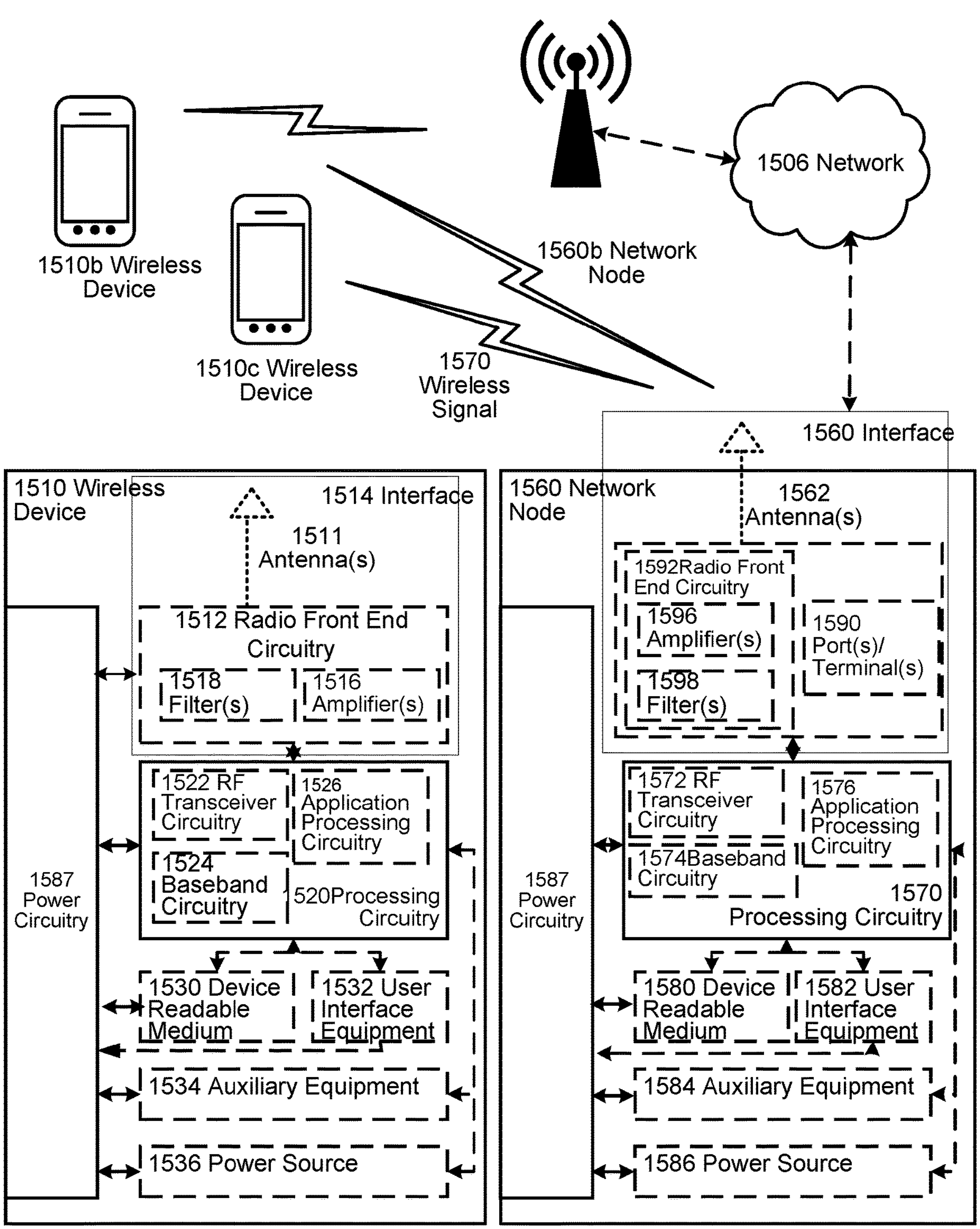
FIG. 15 illustrates an example wireless network.

Although the subject matter described herein may be implemented in any appropriate type of system using any suitable components, the embodiments described herein relate to a wireless network, such as the example wireless communication network illustrated in FIG. 15. For simplicity, the wireless communication network of FIG. 15 only depicts network 1506, network nodes 1560 and 1560*b*, and Wireless Devices (WDs) 1510, 1510*b*, and 1510*c*. The wireless communication network may further include any additional elements suitable to support communication between wireless devices or between a wireless device and another communication device, such as a landline telephone. Of the illustrated components, network node 1560 and wireless device (WD) 1510 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 1560 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 15, Network node 1560 includes processing circuitry 1570, device readable medium 1580, interface 1590, user interface equipment 1582, auxiliary equipment 1584, power source 1586, power circuitry 1587, and antenna 1562. Although network node 1560 illustrated in the example wireless communication network of FIG. 15 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units.

In certain embodiments, some or all of the functionality described herein as being provided by a network node, base station, eNB or other such network device may be provided by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signaling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptopembedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1513 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1513 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
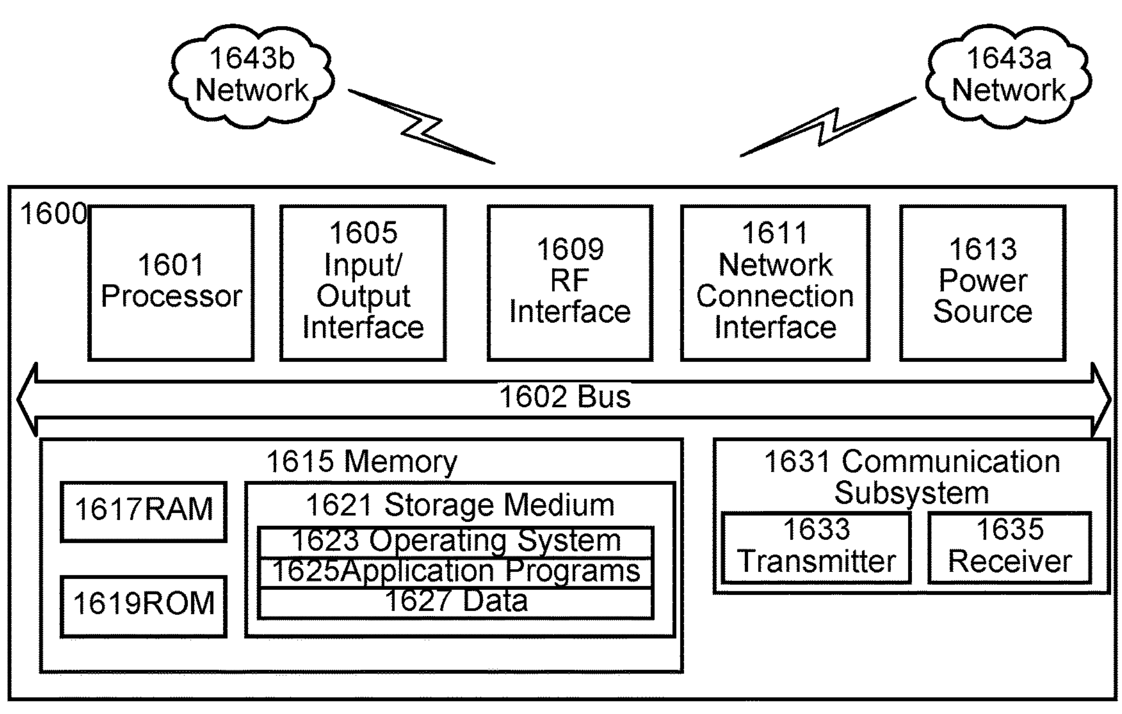
FIG. 16 shows a user equipment according to an embodiment.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1600 may be any UE identified by the 3rd Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1614, and storage medium 1621 or the like, communication subsystem 1631, power source 1613, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643*a*. Network 1643*a* may encompass wired and/or wireless networks such as a local-area network (LAN), a wide-area network (WAN), a computer network, a wireless network, a telecommunications network, another like network or any combination thereof. For example, network 1643*a* may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1614 may be configured to provide computer instructions or data to processing circuitry 1601. For example, ROM 1614 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power 5 source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
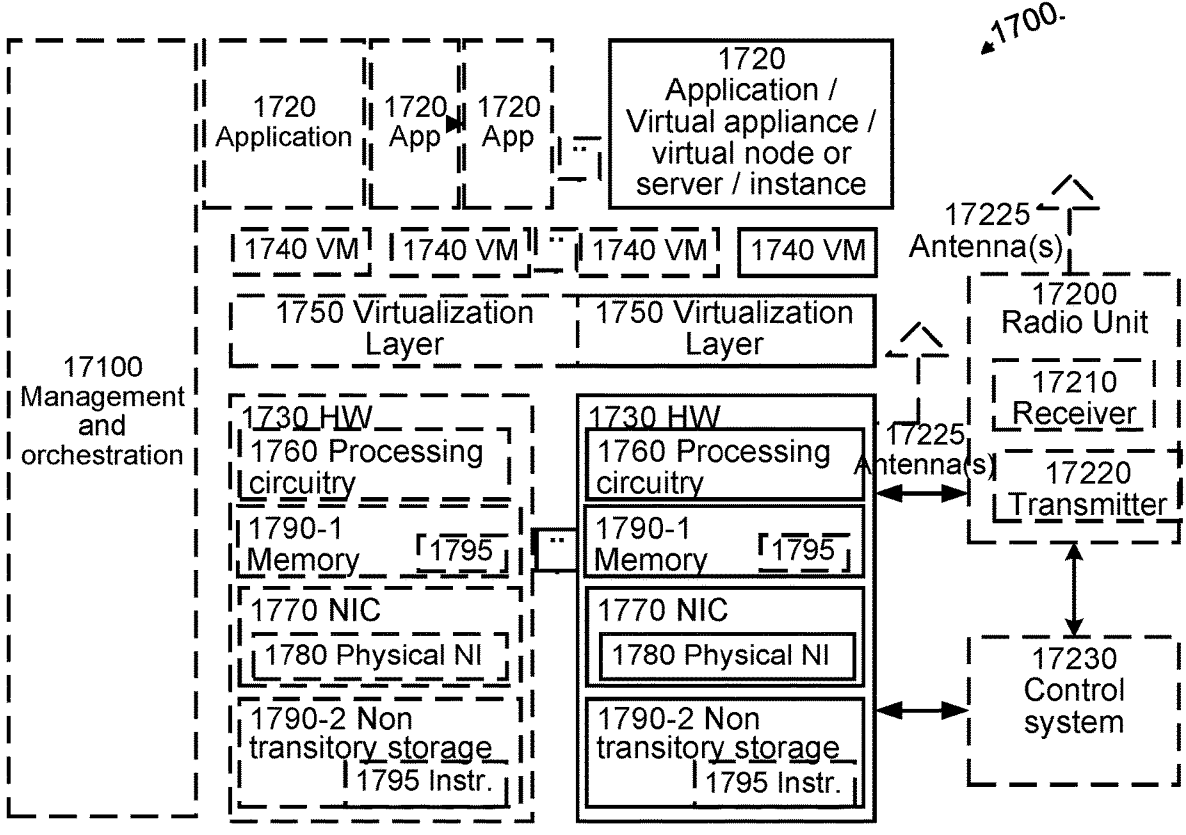
FIG. 17 shows a virtualization environment according to an embodiment.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analogue hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signaling can be affected with the use of control system 17230 which may alternatively be used for communication between the hardware nodes 1730 and radio units 17200.

Figure 18:
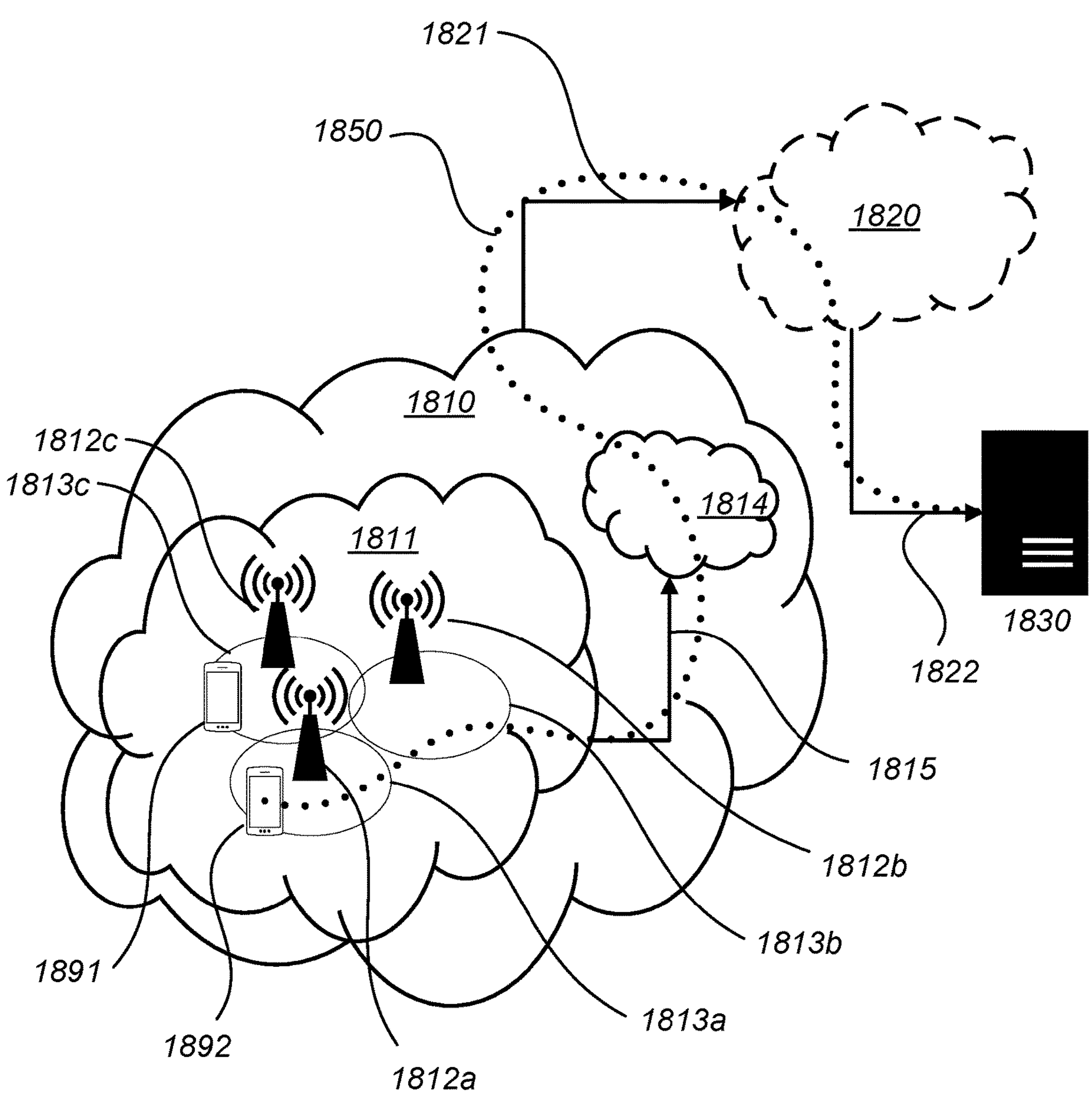
FIG. 18 illustrates an example telecommunication network connected via an intermediate network to a host computer.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* is configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1816 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct, or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

Figure 19:
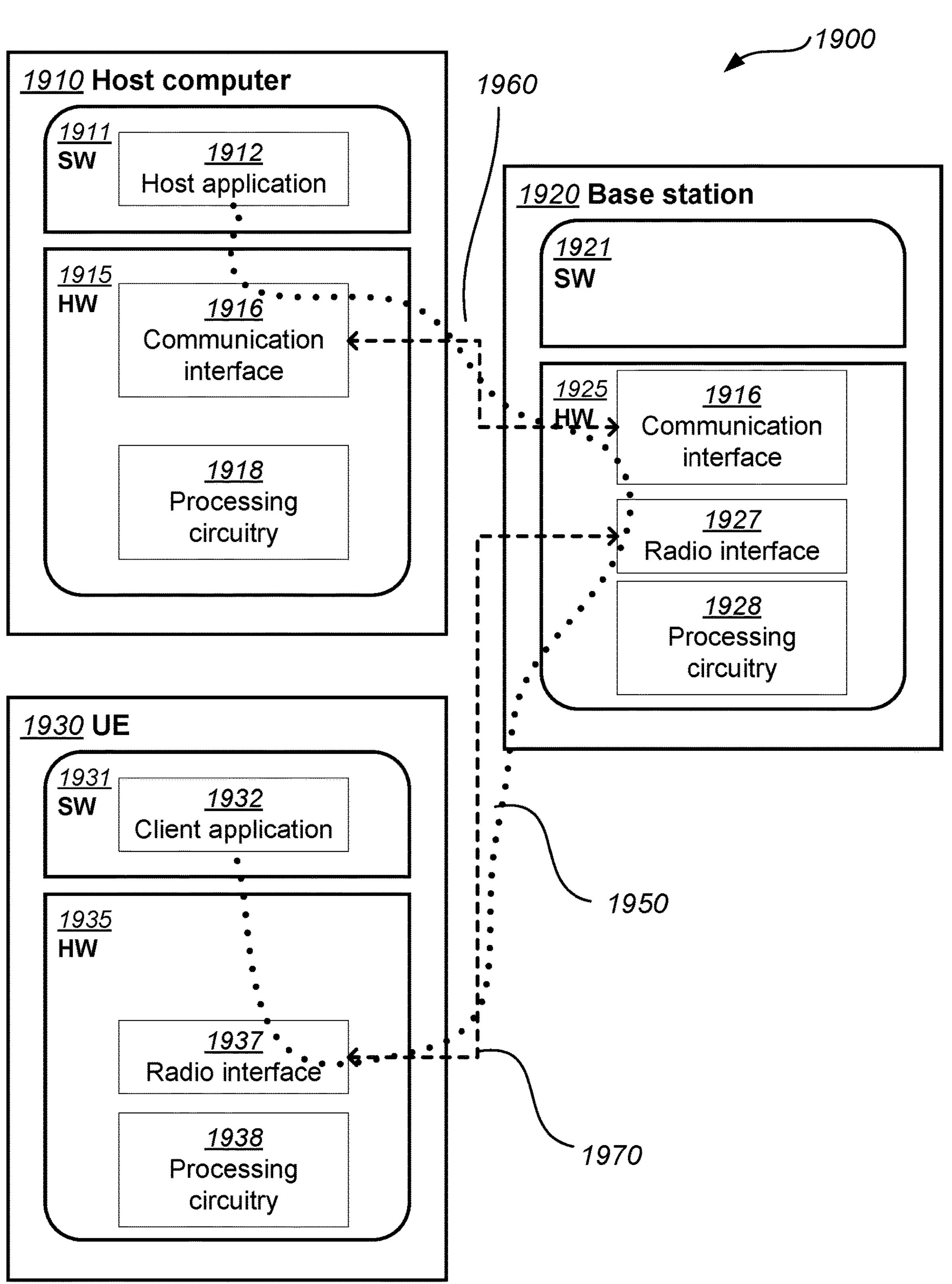
FIG. 19 shows a host computer communicating via a base station with a user equipment over a partially wireless connection according to an embodiment.

It is noted that host computer 1910, base station 1920 and UE 1930 illustrated in FIG. 19 may be similar or identical to host computer 1930, one of base stations 1312*a*, 1312*b*, 1312*c* and one of UEs 1391, 1392 of FIG. 13, respectively. This is to say, the inner workings of these entities may be as shown in FIG. 19 and independently, the surrounding network topology may be that of FIG. 13.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figures 20, 21:
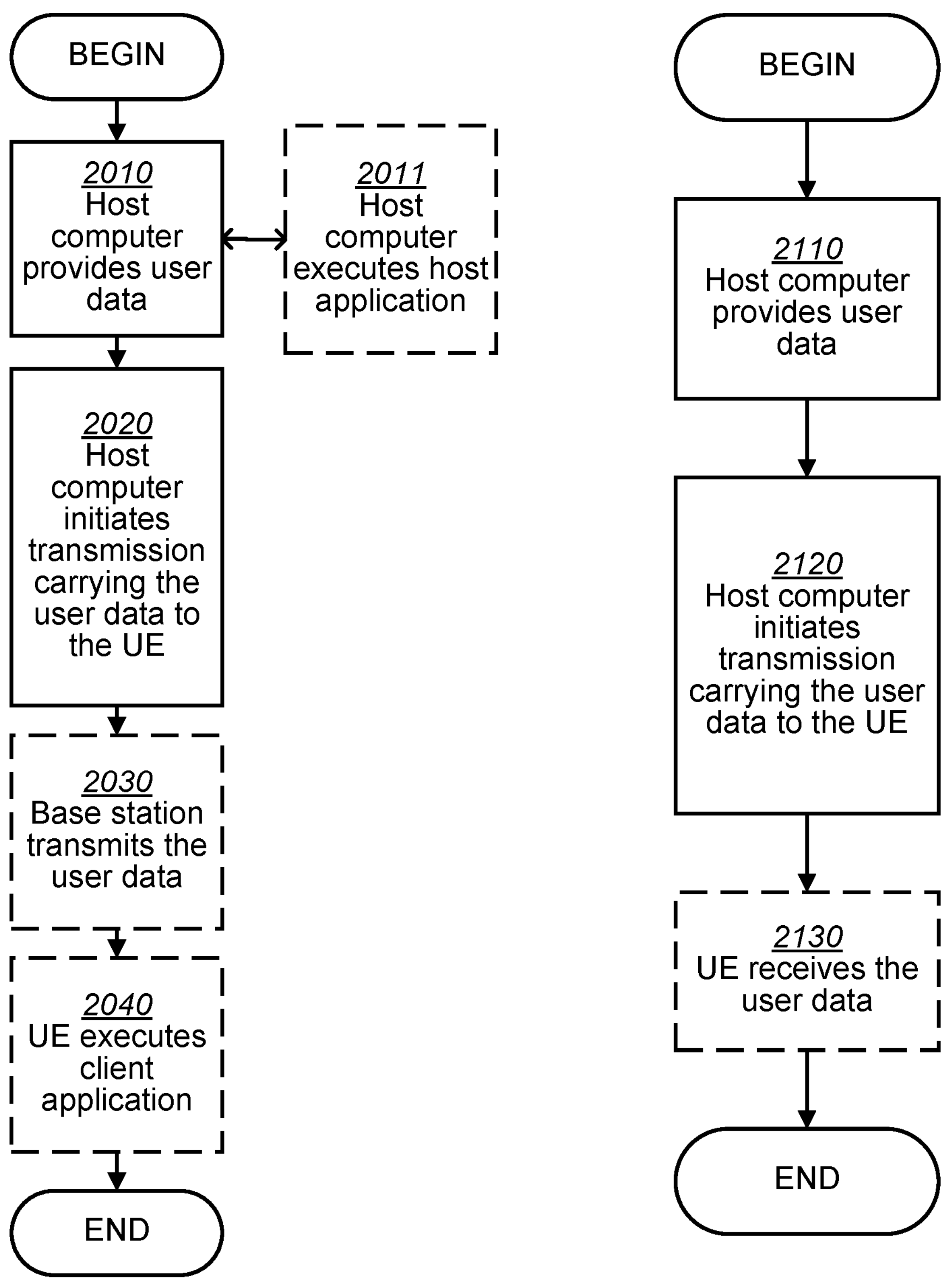
FIGS. 20 and 21 show example methods implemented in a communication system including a host computer, a base station and a user equipment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Numbered Embodiments in Particular Related to FIGS. 15-23

1. A Radio Access Network (RAN) node configured for updating a paging configuration for at least one User Equipment, UE, in a wireless communications system, wherein the RAN node uses at least one beam for transmitting at least one paging message to said at least one UE and, the RAN node comprising a radio interface and processing circuitry configured to:
   obtain information regarding at least one paging condition, wherein the at least one paging condition is associated with a current paging configuration for said at least one UE and wherein the at least one paging condition comprises at least one of a false paging rate, latency, Physical Downlink Control CHannel, PDCCH, load, and PDCCH and Physical Downlink Shared CHannel, PDSCH, imbalance;
   determine whether the obtained information regarding the at least one paging condition exceeds a respective associated threshold;
   update, based on the determination, the current paging configuration into an updated paging configuration for said at least one UE.
2. The RAN node according to embodiment 1, wherein the RAN node is further caused to:
   transmit, to said at least one UE, at least one paging message in said at least one beam in accordance with the updated paging configuration.
3. The RAN node according to any of embodiments 1 and 2, wherein the at least one paging condition comprises a false paging rate and wherein the RAN node is further caused to obtain information regarding at least one paging condition by:
   determining an average numbers of UEs pages per Paging Occasion, PO, and a statistical ratio of paged UEs versus camping UEs.
4. The RAN node according to any of embodiments 1 and 2, wherein the at least one paging condition comprises a false paging rate and wherein the RAN node is further caused to obtain information regarding at least one paging condition by:
   tracking, during a time frame, a number of different paged UEs.
5. The RAN node according to any of embodiments 1 to 4, the RAN node is further caused to update the current paging configuration into an updated paging configuration by:
   adjusting at least one of a number of Page Frames, PF, per DRX cycle and a number of POs per PFs.
6. The RAN node according to embodiment 5, wherein the at least one paging condition comprises the false paging rate and wherein, when it is determined that the false paging rate exceeds the corresponding threshold, the RAN node is further caused to adjust at least one of the number of PF per DRX cycle and the number of POs per PFs by:
   increasing at least one of the number of PFs per DRX cycle and the number of POs per PFs.
7. The RAN node according to any of embodiments 1 to 6, wherein the at least one paging condition comprises a paging response rate and wherein the RAN node is caused to update the current paging configuration into an updated paging configuration by:
   adjusting a number of beams used for the paging.
8. The RAN node according to any of embodiments 1 to 7, wherein the RAN node is caused to update the current paging configuration into an updated paging configuration by:
   adjusting at least one of beam power or beam width of the at least one beam used for the paging.
9. The RAN node according to any of embodiments 1 to 8, wherein the at least one paging condition comprises a paging priority and wherein the RAN node is caused to update the current paging configuration into an updated paging configuration by:
   postponing paging records that are below the respective associated threshold to a next paging occasion.
10. The RAN node according to any of embodiments 1 to 9, wherein the at least one paging condition comprises at least two of a false paging rate, latency and PDCCH load and wherein the RAN node (400) further is caused to:
    determine an acceptable trade-off level between the at least two paging conditions based on the determination of whether the obtained information regarding the at least two paging conditions exceed respective associated thresholds.
11. A Radio Access Network (RAN) node configured for updating a paging transmission parameters in a wireless communications system, the RAN node comprising a radio interface and processing circuitry configured to:
    obtain information regarding User Equipment, UE, link quality in a cell of the wireless communications system; and
    update, based on the obtained information regarding UE link quality, the paging transmission parameters.
12. The RAN node according to embodiment 11, wherein the obtained information regarding UE link quality relates to an average UE link quality or to a worst case UE link quality in the cell.
13. The RAN node according to any of embodiments 11 and 12, wherein the RAN node further is caused to:
    transmit at least one paging message to at least one UE according to the updated paging transmission parameters.

14. The RAN node according to any of embodiments 11 to 13, wherein the RAN node is caused to obtain information regarding UE link quality in a cell of the wireless communications system by:
determining the UE link quality based on reported Radio Resource Management, RRM, measurements, wherein the RRM measurements were made when the UEs were in a connected mode, in conjunction with handovers and/or connection loss.
15. The RAN node according to any of embodiments 11 to 14, wherein the RAN node is caused to obtain information regarding UE link quality in a cell of the wireless communications system by:
transmitting at least one paging message to a plurality of UEs at a specific Physical Downlink Control CHannel, PDCCH, Aggregation Level, AL; and
if more than a threshold value of the plurality of UEs responded to the at least one paging message after a maximum number of paging attempts, determine that the paging transmission parameters is to be updated by lowering the specific PDCCH AL.
16. The RAN node according to embodiment 15, wherein the RAN node is caused to update the paging transmission parameters by:
performing the determined lowering of the PDCCH AL.
17. The RAN node according to embodiment 16, wherein different PDCCH ALs are used in different beams.
18. The RAN node according to any of embodiments 11 to 13, wherein the RAN node is caused to obtain information regarding UE link quality in a cell of the wireless communications system by:
transmitting at least one paging message to a plurality of UEs with different PDCCH and/or Physical Downlink Shared CHannel, PDSCH, signal configurations; and
determining, based on a highest-rate signal configuration where the at least one paging message is successfully received, the information regarding the UE link quality.
19. The RAN node according to any of embodiments 11 to 13, wherein the RAN node is caused to obtain information regarding UE link quality in a cell of the wireless communications system by:
receiving, from a plurality of UEs, information regarding successful and/or unsuccessful reception and decoding of PDCCH and PDSCH.
20. The RAN node according to any of embodiments 11 to 13, wherein the RAN node is caused to obtain information regarding UE link quality in a cell of the wireless communications system by:
obtaining information regarding failed paging related to at least one UE; and
determining, based on the obtained information, to adjust PDSCH transmission code rate.
21. The RAN node according to any of embodiments 11 to 20, wherein the RAN node is caused to update the paging transmission parameters by:
adjusting at least one of a paging PDCCH AL, PDSCH transmission code rate, Transport Block Size, TBS, scaling, output power, cell shape and payload size.
22. The RAN node according to embodiment 21, wherein different TBS scaling and/or output power are used in different beams.
23. A communication system including a host computer comprising:
processing circuitry configured to provide user data; and
a communication interface configured to forward the user data to a cellular network for transmission to a User Equipment (UE),
wherein the cellular network comprises a Radio Access Network (RAN) node having a radio interface and processing circuitry, wherein the RAN node's processing circuitry is configured to obtain information regarding at least one paging condition, wherein the at least one paging condition is associated with a current paging configuration for said at least one UE and wherein the at least one paging condition comprises at least one of a false paging rate, latency, PDCCH load, and PDCCH and PDSCH imbalance; to determine whether the obtained information regarding the at least one paging condition exceeds a respective associated threshold; and to update, based on the determination, the current paging configuration into an updated paging configuration for said at least one UE; or
wherein the cellular network comprises a Radio Access Network (RAN) node having a radio interface and processing circuitry, wherein the RAN node's processing circuitry is configured to obtain information regarding User Equipment, UE, link quality in a cell of the wireless communications system; and to update, based on the obtained information regarding UE link quality, the paging transmission parameters.
24. The communication system of embodiment 23, further including the RAN node.
25. The communication system of embodiment 24, further including the UE, wherein the UE is configured to communicate with the RAN node.
26. The communication system of embodiment 25, wherein:
the processing circuitry of the host computer is configured to execute a host application, thereby providing the user data; and
the UE comprises processing circuitry configured to execute a client application associated with the host application.
27. A method implemented in a Radio Access Network (RAN) node, comprising
obtaining information regarding at least one paging condition, wherein the at least one paging condition is associated with a current paging configuration for said at least one UE and wherein the at least one paging condition comprises at least one of a false paging rate, latency, Physical Downlink Control CHannel, PDCCH, load, and PDCCH and Physical Downlink Shared CHannel, PDSCH, imbalance;
determining whether the obtained information regarding the at least one paging condition exceeds a respective associated threshold; and
updating, based on the determination, the current paging configuration into an updated paging configuration for said at least one UE.
28. A method implemented in a Radio Access Network (RAN) node, comprising
obtaining information regarding User Equipment, UE, link quality in a cell of the wireless communications system; and
updating, based on the obtained information regarding UE link quality, the paging transmission parameters.

29. A method implemented in a communication system including a host computer, a Radio Access Network (RAN) node and a User Equipment (UE), the method comprising: at the host computer, providing user data; and
   at the host computer, initiating a transmission carrying the user data to the UE via a cellular network comprising the RAN node, wherein the RAN node
   obtaining information regarding at least one paging condition, wherein the at least one paging condition is associated with a current paging configuration for said at least one UE and wherein the at least one paging condition comprises at least one of a false paging rate, latency, Physical Downlink Control CHannel, PDCCH, load, and PDCCH and Physical Downlink Shared CHannel, PDSCH, imbalance;
   determining whether the obtained information regarding the at least one paging condition exceeds a respective associated threshold; and
   updating, based on the determination, the current paging configuration into an updated paging configuration for said at least one UE; or wherein the RAN node
   obtaining information regarding User Equipment, UE, link quality in a cell of the wireless communications system; and
   updating, based on the obtained information regarding UE link quality, the paging transmission parameters.
30. The method of embodiment 29, further comprising: at the RAN node, transmitting the user data.
31. The method of embodiment 320, wherein the user data is provided at the host computer by executing a host application, the method further comprising:
   at the UE, executing a client application associated with the host application.
32. A User Equipment (UE) configured to communicate with a Radio Access Network (RAN) node, the UE comprising a radio interface and processing circuitry configured to transmit and receive data to and from the RAN node.
33. A communication system including a host computer comprising:
   processing circuitry configured to provide user data; and
   a communication interface configured to forward user data to a cellular network for transmission to a User Equipment (UE),
   wherein the UE comprises a radio interface and processing circuitry, the UE's processing circuitry configured to transmit and receive data to and from a Radio Access Network (RAN) node.
34. The communication system of embodiment 33, further including the UE.
35. The communication system of embodiment 33, wherein the cellular network further includes a RAN node configured to communicate with the UE.
36. The communication system of embodiment 34 or 35, wherein:
   the processing circuitry of the host computer is configured to execute a host application, thereby providing the user data; and
   the UE's processing circuitry is configured to execute a client application associated with the host application.

37. A method implemented in a communication system including a host computer, a Radio Access Network (RAN) node and a User Equipment (UE), the method comprising:
   at the host computer, providing user data; and
   at the host computer, initiating a transmission carrying the user data to the UE via a cellular network comprising the RAN node, wherein the UE transmits and receives to and from the RAN node.
38. The method of embodiment 37, further comprising: at the UE, receiving the user data from the RAN node.
39. A communication system including a host computer comprising:
   a communication interface configured to receive user data originating from a transmission from a User Equipment (UE) to a Radio Access Network (RAN) node, wherein the UE comprises a radio interface and processing circuitry, the UE's processing circuitry configured to transmit and receive data to and from the RAN node.
40. The communication system of embodiment 39, further including the UE.
41. The communication system of embodiment 40, further including the RAN node, wherein the RAN node comprises a radio interface configured to communicate with the UE and a communication interface configured to forward to the host computer the user data carried by a transmission from the UE to the RAN node.
42. The communication system of embodiment 33 or 34, wherein:
   the processing circuitry of the host computer is configured to execute a host application;
   and the UE's processing circuitry is configured to execute a client application associated with the host application, thereby providing the user data.
43. The communication system of embodiment 41 or 42, wherein:
   the processing circuitry of the host computer is configured to execute a host application, thereby providing request data; and
   the UE's processing circuitry is configured to execute a client application associated with the host application, thereby providing the user data in response to the request data.
44. A method implemented in a User Equipment (UE), comprising transmitting and receiving data to and from a Radio Access Network (RAN) node.
45. The method of embodiment 44, further comprising: providing user data; and
   forwarding the user data to a host computer via the transmission to the RAN node.
46. A method implemented in a communication system including a host computer, a Radio Access Network (RAN) node and a User Equipment (UE), the method comprising:
at the host computer, receiving user data transmitted to the RAN node from the UE, wherein the UE transmitting and receiving data to and from the RAN node.
47. The method of embodiment 46 further comprising: at the UE, providing the user data to the RAN node.
48. The method of embodiment 47, further comprising:
   at the UE, executing a client application, thereby providing the user data to be transmitted; and
   at the host computer, executing a host application associated with the client application.
49. The method of embodiment 48, further comprising: at the UE, executing a client application; and at the UE, receiving input data to the client application, the input data being provided at the host computer by executing a host application associated with the client application, wherein the user data to be transmitted is provided by the client application in response to the input data.

50. A communication system including a host computer comprising a communication interface configured to receive user data originating from a transmission from a User Equipment (UE) to a Radio Access Network (RAN) node, wherein the RAN node comprises a radio interface and processing circuitry, the RAN node's processing circuitry configured to obtain information regarding at least one paging condition, wherein the at least one paging condition is associated with a current paging configuration for said at least one UE and wherein the at least one paging condition comprises at least one of a false paging rate, latency, PDCCH load, and PDCCH and PDSCH imbalance; to determine whether the obtained information regarding the at least one paging condition exceeds a respective associated threshold; and to update, based on the determination, the current paging configuration into an updated paging configuration for said at least one UE; or configured to obtain information regarding User Equipment, UE, link quality in a cell of the wireless communications system; and to update, based on the obtained information regarding UE link quality, the paging transmission parameters.

51. The communication system of embodiment 50, further including the RAN node.

52. The communication system of embodiment 51, further including the UE, wherein the UE is configured to communicate with the RAN node.

53. The communication system of embodiment 52, wherein:

the processing circuitry of the host computer is configured to execute a host application;

the UE is configured to execute a client application associated with the host application, thereby providing the user data to be received by the host computer.

54. A method implemented in a communication system including a host computer, a Radio Access Network (RAN) node and a User Equipment (UE), the method comprising:

at the host computer, receiving, from the RAN node, user data originating from a transmission which the RAN node has received from the UE, wherein the UE transmits and receives data to and from the RAN node.

55. The method of embodiment 54, further comprising: at the RAN node, receiving the user data from the UE.

56. The method of embodiment 55, further comprising: at the RAN node, initiating a transmission of the received user data to the host computer.

57. A User Equipment (UE) configured to communicate with a Radio Access Network (RAN) node, the UE comprising a radio interface and processing circuitry configured to:

receive, from a Radio Access Network, RAN, node, an updated paging configuration and/or updated paging transmission parameters.

58. The UE according to embodiment 57, wherein the UE further is configured to:

Respond to a received paging.

59. A communication system including a host computer comprising:

processing circuitry configured to provide user data; and a communication interface configured to forward the user data to a cellular network for transmission to a User Equipment (UE), wherein the cellular network comprises a RAN node having a radio interface and processing circuitry, the RAN node's processing circuitry configured to obtain information regarding at least one paging condition, wherein the at least one paging condition is associated with a current paging configuration for said at least one UE and wherein the at least one paging condition comprises at least one of a false paging rate, latency, PDCCH load, and PDCCH and PDSCH imbalance; to determine whether the obtained information regarding the at least one paging condition exceeds a respective associated threshold; and to update, based on the determination, the current paging configuration into an updated paging configuration for said at least one UE; or configured to obtain information regarding User Equipment, UE, link quality in a cell of the wireless communications system; and to update, based on the obtained information regarding UE link quality, the paging transmission parameters.

60. The communication system of embodiment 59, further including the RAN node.

61. The communication system of embodiment 60, further including the UE, wherein the UE is configured to communicate with the RAN node.

62. The communication system of embodiment 61, wherein:

the processing circuitry of the host computer is configured to execute a host application, thereby providing the user data; and the UE comprises processing circuitry configured to execute a client application associated with the host application.

63. A method implemented in a UE, comprising receiving, from a RAN node, an updated paging configuration and/or updated paging transmission parameters.

64. A method implemented in a communication system including a host computer, a User Equipment (UE) and a Radio Access Network (RAN) node, the method comprising:

at the host computer, providing user data; and at the host computer, initiating a transmission carrying the user data to the UE via a cellular network comprising the UE, wherein the UE Receiving, from the RAN node, an updated paging configuration and/or updated paging transmission parameters.

65. The method of embodiment 64, further comprising: at the UE, transmitting the user data.

66. The method of embodiment 65, wherein the user data is provided at the host computer by executing a host application, the method further comprising:

at the UE, executing a client application associated with the host application.

67. A User Equipment (UE) configured to communicate with a Radio Access Network (RAN) node, the UE comprising a radio interface and processing circuitry configured to transmit and receive data to and from the RAN node.

68. A communication system including a host computer comprising:

processing circuitry configured to provide user data; and a communication interface configured to forward user data to a cellular network for transmission to a User Equipment (UE), wherein the UE comprises a radio interface and processing circuitry, the UE's processing circuitry configured to transmit and receive data to and from a Radio Access Network (RAN) node.

69. The communication system of embodiment 68, further including the UE.

70. The communication system of embodiment 69, wherein the cellular network further includes a RAN node configured to communicate with the UE.

71. The communication system of embodiment 69 or 70, wherein:

the processing circuitry of the host computer is configured to execute a host application, thereby providing the user data; and the UE's processing circuitry is configured to execute a client application associated with the host application.

72. A method implemented in a communication system including a host computer, a User Equipment (UE) and Radio Access Network (RAN) node, the method comprising:

at the host computer, providing user data; and at the host computer, initiating a transmission carrying the user data to the RAN node via a cellular network comprising the RAN node, wherein the UE transmits and receives to and from the RAN node.

73. The method of embodiment 72, further comprising:

at the UE, receiving the user data from the RAN node.

74. A communication system including a host computer comprising:

a communication interface configured to receive user data originating from a transmission from a User Equipment (UE) to a Radio Access Network (RAN) node, wherein the UE comprises a radio interface and processing circuitry, the UE's processing circuitry configured to transmit and receive data to and from the RAN node.

75. The communication system of embodiment 74, further including the UE.

76. The communication system of embodiment 75, further including the RAN node, wherein the RAN node comprises a radio interface configured to communicate with the UE and a communication interface configured to forward to the host computer the user data carried by a transmission from the UE to the RAN node.

77. The communication system of embodiment 75 or 76, wherein:

the processing circuitry of the host computer is configured to execute a host application; and the UE's processing circuitry is configured to execute a client application associated with the host application, thereby providing the user data.

78. The communication system of embodiment 76 or 77, wherein:

the processing circuitry of the host computer is configured to execute a host application, thereby providing request data; and the UE's processing circuitry is configured to execute a client application associated with the host application, thereby providing the user data in response to the request data.

79. A method implemented in a User Equipment (UE), comprising transmitting and receiving data to and from a Radio Access Network (RAN) node.

80. The method of embodiment 79, further comprising:

providing user data; and forwarding the user data to a host computer via the transmission to the RAN node.

81. A method implemented in a communication system including a host computer, a User Equipment (UE) and a Radio Access Network (RAN) node, the method comprising:

at the host computer, receiving user data transmitted to the RAN node from the UE, wherein the UE transmitting and receiving data to and from the RAN node.

82. The method of embodiment 81, further comprising:

at the UE, providing the user data to the RAN node.

83. The method of embodiment 82, further comprising:

at the UE, executing a client application, thereby providing the user data to be transmitted; and at the host computer, executing a host application associated with the client application.

84. The method of embodiment 83, further comprising:

at the UE, executing a client application; and at the UE, receiving input data to the client application, the input data being provided at the host computer by executing a host application associated with the client application, wherein the user data to be transmitted is provided by the client application in response to the input data.

85. A communication system including a host computer comprising a communication interface configured to receive user data originating from a transmission from a User Equipment (UE) to a Radio Access Network (RAN) node, wherein the UE comprises a radio interface and processing circuitry, the UE's processing circuitry configured to receive, from the RAN node, an updated paging configuration and/or updated paging transmission parameters.

86. The communication system of embodiment 85, further including the RAN node.

87. The communication system of embodiment 86, further including the UE, wherein the UE is configured to communicate with the RAN node.

88. The communication system of embodiment 87, wherein:

the processing circuitry of the host computer is configured to execute a host application;

the UE is configured to execute a client application associated with the host application, thereby providing the user data to be received by the host computer.

89. A method implemented in a communication system including a host computer, a User Equipment (UE) and a Radio Access Network (RAN) node, the method comprising:

at the host computer, receiving, from the RAN node, user data originating from a transmission which the RAN node has received from the UE, wherein the UE transmits and receives data to and from the RAN node.

90. The method of embodiment 89, further comprising:

at the RAN node, receiving the user data from the UE.

91. The method of embodiment 90, further comprising:

at the RAN node, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The following further examples are also encompassed by the present disclosure and may fully or partly be incorporated into embodiments. The reference numerals serve for illustration purposes only and are not intended to limit the examples to what is shown in the drawings.

A1. A method (600) in a Radio Access Network, RAN, node (1100) for updating a paging configuration for at least one User Equipment, UE, (1400) in a wireless communications system, wherein the RAN node (1100) uses at least one radio beam for transmitting at least one paging message to said at least one UE (1400), the method (600) comprising:
- obtaining (610) information regarding at least one paging condition, wherein the at least one paging condition is associated with a current paging configuration for said at least one UE (1400) and wherein the at least one paging condition comprises at least one of a false paging rate, latency, Physical Downlink Control CHannel, PDCCH, load, and PDCCH and Physical Downlink Shared CHannel, PDSCH, imbalance;
- determining (625) whether the obtained information regarding the at least one paging condition exceeds a respective associated threshold; and
- updating (635), based on the determination, the current paging configuration into an updated paging configuration for said at least one UE (1400).

A2. The method (600) according to example A1, wherein the method (600) further comprises:
- transmitting (670), to said at least one UE (1400), at least one paging message in said at least one radio beam in accordance with the updated paging configuration.

A3. The method (600) according to any of example A1 and A2, wherein the at least one paging condition comprises a false paging rate and wherein obtaining (610) information regarding at least one paging condition further comprises:
- determining (615) an average number of UEs paged per Paging Occasion, PO, and a statistical ratio of paged UEs versus camping UEs.

A4. The method (600) according to any of examples A1 and A2, wherein the at least one paging condition comprises a false paging rate and wherein obtaining (610) information regarding at least one paging condition further comprises:
- tracking (620), during a time frame, a number of different paged UEs.

A5. The method (600) according to any of examples A1 to A4, wherein updating (635) the current paging configuration into an updated paging configuration comprises:
- adjusting (640) at least one of a number of Page Frames, PF, per DRX cycle and a number of POs per PFs.

A6. The method (600) according to example A5, wherein the at least one paging condition comprises the false paging rate and wherein, when it is determined that the false paging rate exceeds the corresponding threshold, adjusting (640) at least one of the number of PF per DRX cycle and the number of POs per PFs by:
- increasing (645) at least one of the number of PFs per DRX cycle and the number of POs per PFs.

A7. The method (600) according to any of examples A1 to A6, wherein the at least one paging condition comprises a paging response rate and wherein updating (635) the current paging configuration into an updated paging configuration comprises:
- adjusting (650) a number of radio beams used for the paging.

A8. The method (600) according to any of examples A1 to A7, wherein updating (635) the current paging configuration into an updated paging configuration comprises:
- adjusting (655) at least one of beam power or beam width of the at least one radio beam used for the paging.

A9. The method (600) according to any of examples A1 to A8, wherein the at least one paging condition comprises a paging priority and wherein updating (635) the current paging configuration into an updated paging configuration comprises:
- postponing (660) paging records that are below the respective associated threshold to a next paging occasion.

A10. The method (600) according to any of examples A1 to A9, wherein the at least one paging condition comprises at least two of a false paging rate, latency and PDCCH load and wherein the method (600) further comprises:
- determining (630) an acceptable trade-off level between the at least two paging conditions based on the determination of whether the obtained information regarding the at least two paging conditions exceed respective associated thresholds.

A11. A method (800) in a Radio Access Network, RAN, node (1200) for updating paging transmission parameters in a wireless communications system, the method (800) comprising:

obtaining (810) information regarding User Equipment, UE, link quality in a cell of the wireless communications system; and updating (855), based on the obtained information regarding UE link quality, the paging transmission parameters.

A12. The method (800) according to example A11, wherein the obtained information regarding UE link quality relates to an average UE link quality or to a worst case UE link quality in the cell.

A13. The method (800) according to any of examples A11 to A12, wherein the method (800) further comprises:

transmitting (270) at least one paging message to at least one UE (1400) according to the updated paging transmission parameters.

A14. The method (800) according to any of examples A11 to A13, wherein obtaining (210) information regarding UE link quality in a cell of the wireless communications system comprises:

determining (815) the UE link quality based on reported Radio Resource Management, RRM, measurements, wherein the RRM measurements were made when the UEs were in a connected mode, in conjunction with handovers and/or connection loss.

A15. The method (800) according to any of examples A11 to A13, wherein obtaining (810) information regarding UE link quality in a cell of the wireless communications system comprises:

transmitting (820) at least one paging message to a plurality of UEs at a specific Physical Downlink Control CHannel, PDCCH, Aggregation Level, AL; and if more than a threshold value of the plurality of UEs responded to the at least one paging message after a maximum number of paging attempts, determining (825) that the paging transmission parameters is to be updated by lowering the specific PDCCH AL.

A16. The method (800) according to example A15, wherein updating (855) the paging transmission parameters comprises:

performing (860) the determined lowering of the PDCCH AL.

A17. The method (800) according to example A16, wherein different PDCCH ALs are used in different radio beams.

A18. The method (800) according to any of examples A11 to A13, wherein obtaining (810) information regarding UE link quality in a cell of the wireless communications system comprises:

transmitting (830) at least one paging message to a plurality of UEs with different PDCCH and/or Physical Downlink Shared CHannel, PDSCH, signal configurations; and determining (835), based on a highest-rate signal configuration where the at least one paging message is successfully received, the information regarding the UE link quality.

A19. The method (800) according to any of examples A11 to A13, wherein obtaining (810) information regarding UE link quality in a cell of the wireless communications system comprises:

receiving (850), from a plurality of UEs (1400), information regarding successful and/or unsuccessful reception and decoding of PDCCH and PDSCH.

A20. The method (800) according to any of examples A11 to A13, wherein obtaining (810) information regarding UE link quality in a cell of the wireless communications system comprises:

obtaining (840) information regarding failed paging related to at least one UE (1400); and determining (845), based on the obtained information, to adjust PDSCH transmission code rate.

A21. The method (008) according to any of examples A11 to A20, wherein updating (855) the paging transmission parameters comprises:

adjusting (865) at least one of a paging PDCCH AL, PDSCH transmission code rate, Transport Block Size, TBS, scaling, output power, cell shape and payload size.

A22. The method (800) according to example A21, wherein different TBS scaling and/or output power are used in different radio beams.

A23. A method (900) in a Core Network, CN, node (1300) for updating a paging configuration for at least one User Equipment, UE, (1400) in a wireless communications system, the method (900) comprising:

obtaining (910) information associated with UE type of the at least one UE (1400);

determining (920), based on the obtained information associated with UE type of the at least one UE (1400), whether a current paging configuration used by the at least one UE (1400) is to be updated to an updated paging configuration for said at least one UE (1400); and updating (930), based on the determination, the current paging configuration used by the at least one UE (1400) into the updated paging configuration for said at least one UE (1400).

A24. The method (900) according to example A23, wherein the method (900) further comprises:

broadcasting (960) said updated paging configuration for said at least one UE (1400).

A25. The method (900) according to any of examples A23 and A24, wherein updating (930) the current paging configuration into an updated paging configuration comprises:

adjusting (940) a length of a Discontinuous Reception, DRX, cycle.

A26. The method (900) according to example A25, wherein the obtained information associated with UE type of the at least one UE (1400) comprises information associated with a service application of the at least one UE (1400) and wherein, when it is determined that the current paging configuration is to be updated to an updated paging configuration due to that the service application has changed, or is to be changed, from enhanced Mobile BroadBand, eMBB, to Ultra-Reliable Low-Latency Communication, URLLC, adjusting (940) the length of the DRX cycle comprises:

decreasing (950) a length of the DRX cycle.

A27. A method (1000) in a User Equipment, UE, (1400) for performing paging in a wireless communications system, the method (1000) comprising:

receiving (1010), from a Radio Access Network, RAN, node (1100,1200), an updated paging configuration and/or updated paging transmission parameters.

A28. The method (1000) according to example A24, wherein the method (1000) further comprises:

responding (1020) to a received paging.

A29. A Radio Access Network, RAN, node (1100) configured for updating a paging configuration for at least one User Equipment, UE, (1400) in a wireless communications system, wherein the RAN node (1100) uses at least one radio beam for transmitting at least one paging message to said at least one UE (1400) and wherein the RAN node (1100) comprises:

a processing circuitry (1110); and a memory circuitry (1120) storing computer program code which, when run in the processing circuitry (1110), causes the RAN node (1100) to:

obtain information regarding at least one paging condition, wherein the at least one paging condition is associated with a current paging configuration for said at least one UE (1400) and wherein the at least one paging condition comprises at least one of a false paging rate, latency, Physical Downlink Control CHannel, PDCCH, load, and PDCCH and Physical Downlink Shared CHannel, PDSCH, imbalance;

determine whether the obtained information regarding the at least one paging condition exceeds a respective associated threshold; and update, based on the determination, the current paging configuration into an updated paging configuration for said at least one UE (1400).

A30. The RAN node (1100) according to example A29, wherein the RAN node (1100) further is caused to:

transmit, to said at least one UE (1400), at least one paging message in said at least one radio beam in accordance with the updated paging configuration.

A31. The RAN node (1100) according to any of examples A29 and A30, wherein the at least one paging condition comprises a false paging rate and wherein the RAN node (1100) is further caused to obtain information regarding at least one paging condition by:

determining an average number of UEs paged per Paging Occasion, PO, and a statistical ratio of paged UEs versus camping UEs.

A32. The RAN node (1100) according to any of examples A29 and A30, wherein the at least one paging condition comprises a false paging rate and wherein the RAN node (1100) is further caused to obtain information regarding at least one paging condition by:

tracking, during a time frame, a number of different paged UEs.

A33. The RAN node (1100) according to any of examples A29 to A32, the RAN node (1100) is further caused to update the current paging configuration into an updated paging configuration by:

adjusting at least one of a number of Page Frames, PF, per DRX cycle and a number of POs per PFs.

A34. The RAN node (1100) according to example A33, wherein the at least one paging condition comprises the false paging rate and wherein, when it is determined that the false paging rate exceeds the corresponding threshold, the RAN node (1100) is further caused to adjust at least one of the number of PF per DRX cycle and the number of POs per PFs by:

increasing at least one of the number of PFs per DRX cycle and the number of POs per PFs.

A35. The RAN node (1100) according to any of examples A29 to A34, wherein the at least one paging condition comprises a paging response rate and wherein the RAN node (1100) is caused to update the current paging configuration into an updated paging configuration by:

adjusting a number of radio beams used for the paging.

A36. The RAN node (1100) according to any of examples A29 to A35, wherein the RAN node (1100) is caused to update the current paging configuration into an updated paging configuration by:

adjusting at least one of beam power or beam width of the at least one radio beam used for the paging.

A37. The RAN node (1100) according to any of examples A29 to A36, wherein the at least one paging condition comprises a paging priority and wherein the RAN node (1100) is caused to update the current paging configuration into an updated paging configuration by:

postponing paging records that are below the respective associated threshold to a next paging occasion.

A38. The RAN node (1100) according to any of examples A29 to A37, wherein the at least one paging condition comprises at least two of a false paging rate, latency and PDCCH load and wherein the RAN node (1100) further is caused to:

determine an acceptable trade-off level between the at least two paging conditions based on the determination of whether the obtained information regarding the at least two paging conditions exceed respective associated thresholds.

A39. A Radio Access Network, RAN, node (1200) configured for updating paging transmission parameters in a wireless communications system, wherein the RAN node (1200) comprises:

a processing circuitry (1210); and a memory circuitry (1220) storing computer program code which, when run in the processing circuitry (1210), causes the RAN node (1200) to:

obtain information regarding User Equipment, UE, link quality in a cell of the wireless communications system; and update, based on the obtained information regarding UE link quality, the paging transmission parameters.

A40. The RAN node (1200) according to example A39, wherein the obtained information regarding UE link quality relates to an average UE link quality or to a worst case UE link quality in the cell.

A41. The RAN node (1200) according to any of examples A39 and A40, wherein the RAN node (1200) further is caused to:

transmit at least one paging message to at least one UE (1400) according to the updated paging transmission parameters.

A42. The RAN node (1200) according to any of examples A39 to A41, wherein the RAN node (1200) is caused to obtain information regarding UE link quality in a cell of the wireless communications system by:

determining the UE link quality based on reported Radio Resource Management, RRM, measurements, wherein the RRM measurements were made when the UEs were in a connected mode, in conjunction with handovers and/or connection loss.

A43. The RAN node (1200) according to any of examples A39 to A41, wherein the RAN node (1200) is caused to obtain information regarding UE link quality in a cell of the wireless communications system by:

transmitting at least one paging message to a plurality of UEs at a specific Physical Downlink Control CHannel, PDCCH, Aggregation Level, AL; and if more than a threshold value of the plurality of UEs responded to the at least one paging message after a maximum number of paging attempts, determine that the paging transmission parameters is to be updated by lowering the specific PDCCH AL.

A44. The RAN node (1200) according to example A43, wherein the RAN node (1200) is caused to update the paging transmission parameters by:

performing the determined lowering of the PDCCH AL.

A45. The RAN node (1200) according to example A44, wherein different PDCCH ALs are used in different radio beams.

A46. The RAN node (1200) according to any of examples A39 to A41, wherein the RAN node (1200) is caused to obtain information regarding UE link quality in a cell of the wireless communications system by:

transmitting at least one paging message to a plurality of UEs with different PDCCH and/or Physical Downlink Shared CHannel, PDSCH, signal configurations; and determining, based on a highest-rate signal configuration where the at least one paging message is successfully received, the information regarding the UE link quality.

A47. The RAN node (1200) according to any of examples A39 to A41, wherein the RAN node (400) is caused to obtain information regarding UE link quality in a cell of the wireless communications system by:

receiving, from a plurality of UEs, information regarding successful and/or unsuccessful reception and decoding of PDCCH and PDSCH.

A48. The RAN node (1200) according to any of examples A39 to A41, wherein the RAN node (1200) is caused to obtain information regarding UE link quality in a cell of the wireless communications system by:

obtaining information regarding failed paging related to at least one UE (1400); and determining, based on the obtained information, to adjust PDSCH transmission code rate.

A49. The RAN node (1200) according to any of examples A39 to A48, wherein the RAN node (1200) is caused to update the paging transmission parameters by:

adjusting at least one of a paging PDCCH AL, PDSCH transmission code rate, Transport Block Size, TBS, scaling, output power, cell shape and payload size.

A50. The RAN node (1200) according to example A49, wherein different TBS scaling and/or output power are used in different radio beams.

A51. A Core Network, CN, node (1300) configured for updating a paging configuration for at least one User Equipment, UE, (1400) in a wireless communications system, wherein the CN node (1300) comprises:

a processing circuitry (1310); and a memory circuitry (1320) storing computer program code which, when run in the processing circuitry (1310), causes the CN node (1300) to:

obtain information associated with UE type of the at least one UE (1400);

determine, based on the obtained information associated with UE type of the at least one UE (1400), whether a current paging configuration used by the at least one UE is to be updated to an updated paging configuration for said at least one UE (1400); and update, based on the determination, the current paging configuration used by the at least one UE (1400) into the updated paging configuration for said at least one UE (1400).

A52. The CN node (1300) according to example A51, wherein the CN node (1300) further is caused to:

broadcast said updated paging configuration for said at least one UE (1400).

A53. The CN node (1300) according to any of examples A51 and A52, wherein the CN node (1300) is caused to update the current paging configuration into an updated paging configuration by:

adjusting a length of a Discontinuous Reception, DRX, cycle.

A54. The CN node (1300) according to example A53, wherein the obtained information associated with UE type of the at least one UE (1400) comprises information associated with a service application of the at least one UE (1400) and wherein, when it is determined that the current paging configuration is to be updated to an updated paging configuration due to that the service application has changed, or is to be changed, from enhanced Mobile BroadBand, eMBB, to Ultra-Reliable Low-Latency Communication, URLLC, the CN node (500) is caused to adjust the length of the DRX cycle by:

decreasing a length of the DRX cycle.

A55. A User Equipment, UE, (1400) configured for performing paging in a wireless communications system, wherein the UE (1400) comprises:

a processing circuitry (1410); and a memory circuitry (1420) storing computer program code which, when run in the processing circuitry (1410), causes the UE (1400) to:

receive, from a Radio Access Network, RAN, node (1100,1200), an updated paging configuration and/or updated paging transmission parameters.

A56. The UE (1400) according to example A55, wherein the UE (1400) further is caused to:

respond to a received paging.

A57. Computer program, comprising instructions which, when executed on a processing circuitry, cause the processing circuitry to carry out the method according to any one of examples A1 to A10 and/or A11 to A22 and/or A23 to A26 and/or A27 to A28.

A58. A carrier containing the computer program of example A57, wherein the carrier is one of an electronic signal, optical signal, radio signal, or computer readable storage medium.

End of further example embodiments.

The invention claimed is:

1. A method in a radio access network (RAN) node for updating a paging configuration for at least a first user equipment (UE) in a wireless communications system, wherein the RAN node uses a plurality of radio beams to page a plurality of UEs, the plurality of radio beams including at least a first beam and a second beam and the plurality of UEs including at least the first UE and a second UE, and the RAN node uses at least the first radio beam for transmitting at least one paging message to the first UE, the method comprising:

obtaining information regarding at least one paging condition, wherein the at least one paging condition is associated with a current paging configuration for the first UE and wherein the at least one paging condition comprises at least one of latency, Physical Downlink Control Channel (PDCCH) load, and PDCCH and Physical Downlink Shared Channel (PDSCH) imbalance;

determining whether the obtained information regarding the at least one paging condition exceeds a respective associated threshold; and updating, based on the determination, the current paging configuration into an updated paging configuration for the first UE, wherein updating the current paging configuration comprises:

adjusting the beam power of the first radio beam;

adjusting the beam width of the first radio beam; and/or increasing the number of beams that are used to page the first UE.

2. The method of claim 1, wherein the method further comprises:

transmitting, to the first UE, at least one paging message in more than one radio beams in accordance with the updated paging configuration.

3. The method of claim 1, wherein the at least one paging condition further comprises a false paging rate and wherein obtaining information regarding at least one paging condition further comprises:

determining an average number of UEs paged per Paging Occasion (PO) and a statistical ratio of paged UEs versus camping UEs.

4. The method of claim 1, wherein the at least one paging condition comprises a false paging rate and wherein obtaining information regarding at least one paging condition further comprises:

tracking, during a time frame, a number of different paged UEs.

5. The method of claim 1, wherein updating the current paging configuration into an updated paging configuration further comprises:

adjusting at least one of a number of Page Frames (PFs) per Discontinuous Reception (DRX) cycle and a number of paging occasions (POs) per PFs.

6. The method of claim 1, wherein the at least one paging condition comprises a paging response rate and wherein updating the current paging configuration into an updated paging configuration further comprises:

adjusting a number of radio beams used for the paging.

7. The method of claim 1, wherein updating the current paging configuration into an updated paging configuration comprises:

adjusting the beam power of the first radio beam; and/or adjusting the beam width of the first radio beam.

8. The method of claim 1, wherein the at least one paging condition comprises a paging priority and wherein updating the current paging configuration into an updated paging configuration further comprises:

postponing paging records that are below the respective associated threshold to a next paging occasion.

9. The method of claim 1, wherein the at least one paging condition further comprises at least two of a false paging rate, latency and PDCCH load and the method comprising:

determining an acceptable trade-of level between the at least two conditions based on the determination of whether the obtained information regarding the at least two conditions exceed respective associated thresholds.

10. The method of claim 1, further comprising updating paging transmission parameters, wherein updating paging transmission parameters comprises:

obtaining information regarding link quality of the plurality of UEs;

updating, based on the obtained information regarding UE link quality, the paging transmission parameters, wherein the obtained information regarding UE link quality relates to an average UE link quality or to a worst case UE link quality; and transmitting at least one paging message to at least one UE according to the updated paging transmission parameters at a specific PDCCH aggregation level (AL); and if more than a threshold value of the plurality of UEs responded to the at least one paging message after a maximum number of paging attempts, determining that the paging transmission parameters is to be updated by lowering the specific PDCCH AL.

11. A radio access network (RAN) node for updating a paging configuration for at least a first user equipment (UE) in a wireless communications system, wherein the RAN node uses a plurality of radio beams to page a plurality of UEs, the plurality of radio beams including at least a first beam and a second beam and the plurality of UEs including at least the first UE and a second UE, and the RAN node uses at least the first radio beam for transmitting at least one paging message to the first UE, the RAN node comprising a radio interface and processing circuity configured to:

obtain information regarding at least one paging condition, wherein the at least one paging condition is associated with a current paging configuration for the first UE and wherein the at least one paging condition comprises at least one of latency, Physical Downlink Control Channel (PDCCH) load, and PDCCH and Physical Downlink Shared Channel (PDSCH) imbalance;

determine whether the obtained information regarding the at least one paging condition exceeds a respective associated threshold; and update, based on the determination, the current paging configuration into an updated paging configuration for the first UE, wherein updating the current paging configuration comprises:

adjusting the beam power of the first radio beam;

adjusting the beam width of the first radio beam; and/or increasing the number of beams that are used to page the first UE.

12. The RAN node of claim 11, wherein the RAN node is further configured to:

transmit to the first UE, at least one paging message in more than one radio beams in accordance with the updated paging configuration.

13. The RAN node of claim 11, wherein the at least one paging condition further comprises a false paging rate and wherein the obtaining information regarding at least one paging condition further comprises:

determining an average number of UEs paged per paging occasion (PO) and a statistical ratio of paged UEs versus camping UEs.

14. The RAN node of claim 11, wherein the at least one paging condition comprises a false paging rate and wherein the obtaining information regarding at least one paging condition further comprises:

tracking, during a time frame, a number of different paged UEs.

15. The RAN node of claim 11, wherein the updating the current paging configuration into an updated paging configuration further comprises:

adjusting at least one of a number of page frames (PFs) per Discontinuous Reception (DRX) cycle and a number of paging occasions (POs) per PFs.

16. The RAN node of claim 11, wherein the at least one paging condition comprises a paging response rate and wherein the updating the current paging configuration into an updated paging configuration further comprises:

adjusting a number of radio beams used for the paging.

17. The RAN node of claim 11, wherein the updating the current paging configuration into an updated paging configuration comprises:

adjusting the beam power of the first radio beam; and/or adjusting the beam width of the first radio beam.

18. The RAN node of claim 11, wherein the at least one paging condition comprises a paging priority and wherein the updating the current paging configuration into an updated paging configuration further comprises:

postponing paging records that are below the respective associated threshold to a next paging occasion.

19. The RAN node of claim 11, wherein the at least one paging condition further comprises at least two of a false paging rate, latency and PDCCH load and the RAN node is further configured to:

determine an acceptable trade-of level between the at least two conditions based on the determination of whether the obtained information regarding the at least two conditions exceed respective associated thresholds.

20. The RAN node of claim 11, wherein the RAN node is further configured to update paging transmission parameters, wherein updating paging transmission parameters comprises to configure the RAN node to:

obtain information regarding link quality of the plurality of UEs;

update, based on the obtained information regarding UE link quality, the paging transmission parameters, wherein the obtained information regarding UE link quality relates to an average UE link quality or to a worst case UE link quality; and transmit at least one paging message to at least one UE according to the updated paging transmission parameters at a specific PDCCH aggregation level (AL); and if more than a threshold value of the plurality of UEs responded to the at least one paging message after a maximum number of paging attempts, determining that the paging transmission parameters is to be updated by lowering the specific PDCCH AL.

* * * * *